United States Patent [19]

Nilakantan et al.

[11] Patent Number: 5,541,911
[45] Date of Patent: Jul. 30, 1996

[54] REMOTE SMART FILTERING COMMUNICATION MANAGEMENT SYSTEM

[75] Inventors: Chandrasekharan Nilakantan, Cupertino; Kiho Yum, Campbell; Ta-Sheng Lin, San Jose, all of Calif.

[73] Assignee: 3Com Corporation, Santa Clara, Calif.

[21] Appl. No.: 321,748

[22] Filed: Oct. 12, 1994

[51] Int. Cl.$^6$ .................................................. H04L 12/26
[52] U.S. Cl. .......................... 370/13; 370/17; 370/85.13
[58] Field of Search .............................. 370/17, 60, 60.1, 370/85.13, 85.14, 94.1, 94.2, 13

[56] References Cited

U.S. PATENT DOCUMENTS

| | | | |
|---|---|---|---|
| 5,280,470 | 1/1994 | Buhrke et al. | 370/17 X |
| 5,280,481 | 1/1994 | Chang et al. | |
| 5,313,465 | 5/1994 | Perlman et al. | 370/85.13 |
| 5,321,694 | 6/1994 | Chang et al. | |
| 5,423,002 | 6/1995 | Hart | 370/85.13 X |
| 5,434,863 | 7/1995 | Onishi et al. | 370/85.13 |

OTHER PUBLICATIONS

"Plug Into Remote Connectivity", NetAge, Product Literature, 3Com Corporation, Santa Clara, California, 1994.

*Primary Examiner*—Melvin Marcelo
*Attorney, Agent, or Firm*—Haynes & Davis

[57] ABSTRACT

Network traffic from a central device across a communication link to a remote device is controlled based upon central traffic management resources in the central device. The central traffic management resources are coupled to a communication link and monitor data packets received across the communication link to learn characteristics of the remote network. Based on the learned characteristics, traffic management messages are generated in the central traffic management resources. These messages are forwarded to an interface device on the remote network, where traffic on the communication link is controlled in response to the traffic management messages. Thus, the remote interface is configured automatically by central traffic management resources running in the central device without human intervention at the remote network. The traffic management messages manage traffic across a communication link of two types. First, traffic management messages identify types of packets to be forwarded from the remote interface across the communication link. Second, traffic management messages identify types of packets to be composed by the remote interface for communication to users of the remote network. Thus, packages originating on the remote network are filtered so that only necessary packets are forwarded to the central site. Similarly, packets which normally originate from the central site are "spoofed" at the remote site in response to management messages generated at the central site. The central traffic management resources execute a transport protocol for the traffic management messages which are independent of a network address for the remote interface.

31 Claims, 9 Drawing Sheets

FIG.—6

```
1   if ( port is BoundaryRouting, SmartFiltering, and the link is up )
2       initiate the SFMCB for the port -
3       register as an SNL client to receive link status
4       send an SNMP "Set a3SfControl to enabled" request to the leaf node
5       if ( NoError in the SNMP response received )
6           start a timer to allow establishing of initial routing information
7           start run-time SmartFiltering operations
8           else  /*timed-out or Error in response*/
9               free the SFMCB and exit
10  else
11      free the SFMCB and exit
```

FIG. 8

```
1   if ( starting or port/protocol configuration changed )
2       send an SNMP "Set a 3SfProtocolCtrl to (protocols enabled)" to the leaf node
3   if ( starting or routing information changed )
4       send SNMP Set requests to establish necessary filters
5       send SNMP Set requests to establish packets to be spoofed on the leaf network
6       remove "dead" station entries when notified by the leaf node
```

FIG. 9

```
1  if ( port is NoBoundaryRouting or NoSmartFiltering )
2      send an SNMP 'Set a3SfResetCtrl' request to the leaf node
3      de-register from SNL
4      free the SFMCB and exit
5  if ( link is down )
6      start a timer in case the link becomes active again
7      if ( timed out )
8          disable the SFMCB
```

FIG. 10

```
1  if ( SNMP request has timed out )
2      re-send the request until reaching a pre-determined limit
3      if ( reaching the retransmit limit )
4          free the SFMCB and exit
5  if ( out of resources or run into serious problem )
6      send an SNMP 'Set a3SfResetCntrl' request to the leaf node if possible
7      free the SFMCB and exit
```

FIG. 11

```
1   if ( IPX RIP/SAP packet from server on local network )
2       if ( changed RIP/SAP packet indicated upon review of RIP/SAP table )
3           compose changed RIP/SAP message
4           forward to BoundaryRouting, SmartFiltering ports
5           send changed RIP/SAP message to leaf node(s)
6           send RIP/SAP packet to those ports not configured for
7               BoundaryRouting, Smart Filtering
8           (at leaf node) begin spoofing RIP/SAP packet with changes
9       else /* no change */
10          send RIP/SAP packet only to those ports not configured for
11              BoundaryRouting, Smart Filtering
12  else /* RIP/SAP packet from server on leaf network */
13      update RIP/SAP tables
14      determine MAC address of server originating RIP/SAP packet
15      send filter message to leaf node with MAC address of server
16      (at leaf node) begin filtering broadcast packets having source address equal
17          to MAC address of server.
```

FIG.12

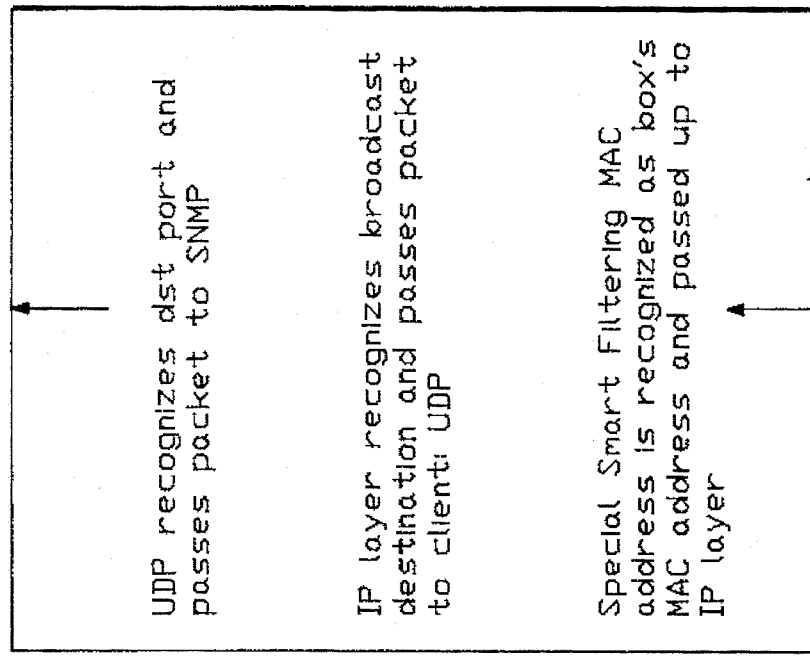
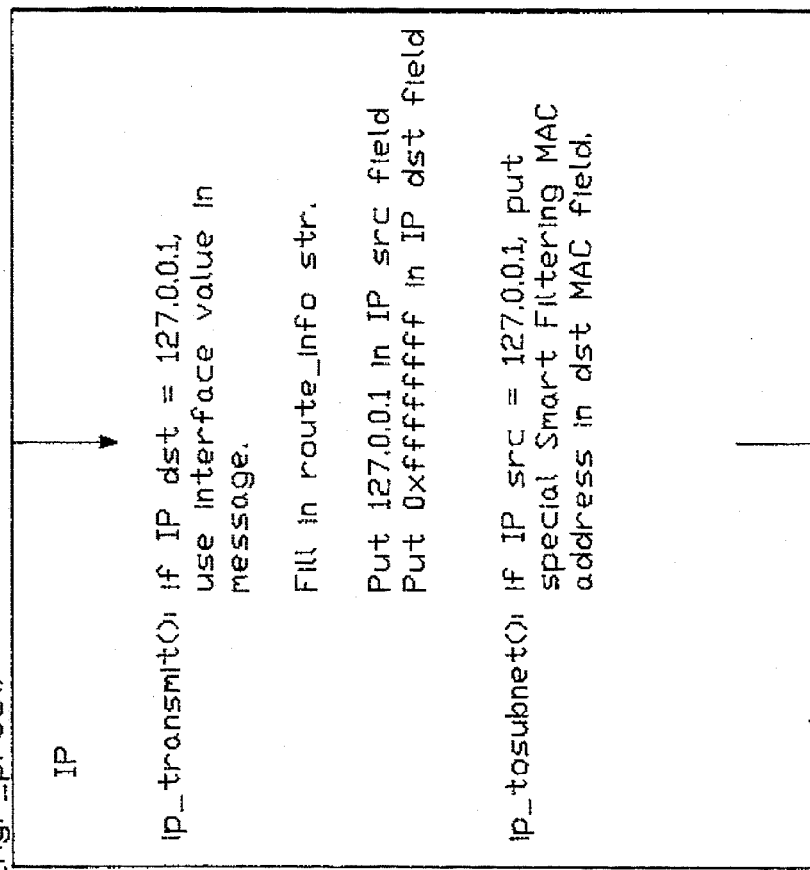
FIG. 13

REMOTE SMART FILTERING COMMUNICATION MANAGEMENT SYSTEM

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention relates to interconnecting data networks, and more particularly to managing traffic between interconnected networks for efficient use of communication resources.

2. Description of Related Art

A trend toward connecting remote offices to headquarters through wide area networks (WANs) is rapidly picking up speed. Using interconnected networks, people working in remote offices may gain access to electronic mail systems, client server applications, share files, and other corporate resources which are managed at the central site.

Technologies have been developing to facilitate the interconnecting of remote offices to meet this need. One example is the boundary routing systems architecture of 3Com Corporation, the assignee of the present application, as described in U.S. Pat. No. 5,423,002. See also, "Plug in to Remote Connectivity", NetAge, published by 3Com Corporation, Vol. 3, No. 2, March/April 1994, p. 1–5. According to the boundary routing systems architecture, a remote network is provided with an extended interface to network management resources, such as a multiprotocol router located at a central site. All management of the router is done by an administrator at a central site, who does not need to visit the remote site to ensure full access to users of the remote network. The extended interface is provided by transparently inserting a WAN connection between the central site and the remote network.

One of the significant expenses of interconnecting remote offices to the central site are costs of WAN services. For instance, local area networks often generate substantial background traffic. For example, the Internetwork Packet Exchange (IPX) protocol executed by NetWare routers, distributed by Novell, Inc., execute the so-called Routing Information Protocol (RIP) and Service Advertising Protocol (SAP). The RIP protocol involves periodic RIP broadcast packets containing all routing information known to the router. The packets are used to keep the internetwork synchronized and provide a means of aging those networks which might become inaccessible. Also, the SAP protocol involves periodically sending SAP broadcast packets containing all server information known to the SAP agent. These broadcasts keep all routers on the internetwork synchronized to provide a means of aging servers in the network. WAN usage by the background broadcasts can be quite high.

Thus, there is a need to manage the usage of WAN services, without unduly increasing the administration required at remote sites, and without unduly restricting usage of resources at the headquarters by the remote network.

SUMMARY OF THE INVENTION

The present invention provides an apparatus which controls network traffic between a central device and a remote device across a communication link based upon central traffic management resources in the central device. The central traffic management resources are coupled to the communication link and monitor data packets received across the communication link to learn characteristics of the remote network. Based on the learned characteristics, traffic management messages are generated in the central traffic management resources. These messages are forwarded to an interface device on the remote network, where traffic on the communication link is controlled in response to the traffic management messages. Thus, the remote interface is configured automatically by central traffic management resources running in the central device without human intervention at the remote network.

The traffic management messages manage traffic across a communication link of two types. Traffic management messages identify (1) types of packets to be forwarded from the remote interface across the communication link, and (2) types of packets to be transmitted by the remote interface to users of the remote network. Thus, packets originating on the remote network are filtered so that only necessary packets are forwarded to the central site. Similarly, packets which normally originate from the central site are "spoofed" at the remote site in response to management messages generated at the central site.

To further enhance the "plug and play" aspect of the present invention, the central traffic management resources execute a transport protocol for the traffic management messages which are independent of a network address for the remote interface.

The present invention can also be characterized as a system for controlling traffic across a communication link between a remote network and a central device. The system, according to this aspect, comprises a remote network interface, connected to the remote network, including data forwarding resources which, according to forwarding rules, forward data packets originated by users of the remote network across the communication link to the central device in response to characteristics of the data packets. In addition, central link management resources are located in the central device. These resources monitor characteristics of the forwarded data packets received across the communication link from the remote network interface to learn characteristics of users of the remote network. In response to the learned characteristics, these resources generate link management messages and forward the link management messages to the remote interface. Remote link management resources in the remote interface are responsive to the link management messages. In response to these messages, the forwarding rules are tailored to the learned characteristics of the users of the remote network to reduce unnecessary traffic on the communication link.

The central link management resources may also generate remote network management messages based on a protocol executed by other users of the central device, and forward these remote network management messages to the remote interface. In this aspect, the remote network management resources in the remote interface produce network management packets in response to the remote network management messages, and communicate the network management packets to the users of the remote network as needed according to the protocol. Thus, network management packets normally originated at the central site, are spoofed by the remote interface, further reducing the amount of traffic required to go through the WAN link.

The central link management resources may also monitor characteristics of data packets received from the other users of the central device to learn about changes which need to be made in the network management packets produced in the remote network management resources. In response to these learned changes, network management messages indicating the changes are generated and forwarded to the remote interface. Resources in the remote network interface change the remote network management packets in response to the network management messages indicating the changes.

A transport mechanism is included in the system which provides for communication of the link management messages and the network management messages to the remote interface independent of the network address of the remote interface.

According to yet another aspect of the present invention, the WAN traffic management is implemented in the boundary router systems architecture, in which the remote interface forwards unicast frames of data from users of the second network which are addressed to an extended interface of the central site and broadcast frames, across a communication link to the central site, and forwards frames received from the central site to the remote network when they are not addressed to the remote interface. In this environment, the link manager in the central site monitors packets received across the communication link to learn the characteristics of the remote network and produces traffic management messages in response to the learned characteristics. These traffic management messages are forwarded to the remote interface where a link manager agent filters broadcast frames in response to the traffic management messages. Also, the link manager and link manager agent may be set up to spoof network management frames which would normally be generated at the central site, as described above.

Accordingly, the present invention provides a "Smart Filtering" mechanism by which a remote office may be interconnected to a central site with very low administrative overhead, and with carefully managed WAN traffic. The system provides for learning the characteristics of the remote network, and keeping the remote network informed of changes occurring in the central site. Based on these characteristics, a filtering/spoofing agent is enabled automatically in the remote site to manage WAN traffic based upon advice from the central site.

Other aspects and advantages of the present invention can be seen upon review of the figures, the detailed description, and the claims which follow.

BRIEF DESCRIPTION OF THE FIGURES

FIG. 8 is a "pseudo-code" diagram of the startup routine for a Smart Filtering port according to the present invention.

FIG. 9 is a "pseudo-code" diagram of run time Smart Filtering adjustments according to the present invention.

FIG. 10 is a "pseudo-code" diagram of an algorithm used for shutting down the Smart Filtering function on a port.

FIG. 11 is a "pseudo-code" illustration of an algorithm for handling exceptions in the Smart Filtering environment.

FIG. 12 is a "pseudo-code" illustration of the Smart Filtering trigger algorithm according to the present invention.

FIG. 13 provides a perspective of "address-less" transport mechanisms used in one aspect of the present invention.

DETAILED DESCRIPTION

Figure 1:
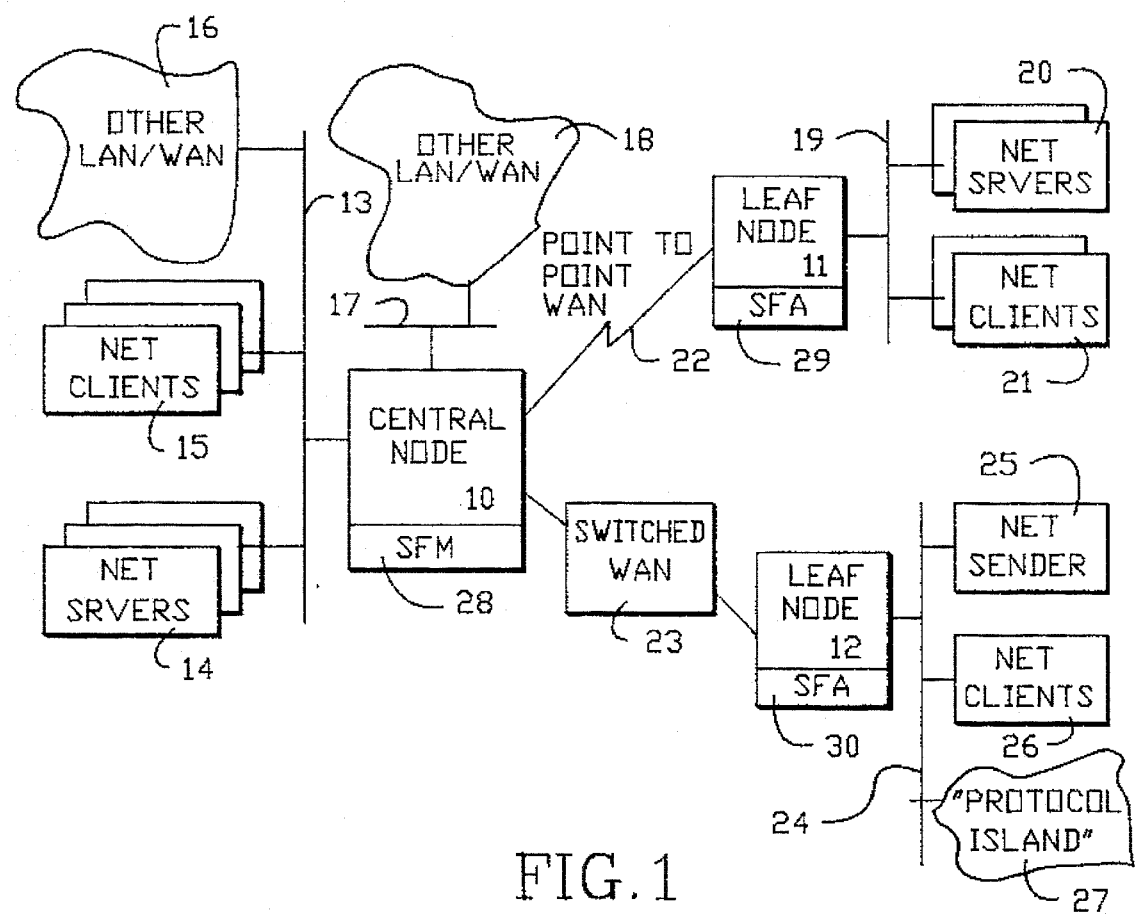
FIG. 1 is a schematic diagram of networks interconnected according to the present invention with a Smart Filtering manager on the central node, and Smart Filtering agents on leaf nodes.

FIG. 1 provides a perspective of a plurality of interconnected networks, including a central node 10, a leaf node 11, and a leaf node 12. The central node 10 may comprise a network intermediate system, such as a multiprotocol router. One example of the multiprotocol router is known as the NetBuilder II system provided by 3Com Corporation of Santa Clara, Calif.

This central node 10 is coupled to a first local area network 13 which includes a plurality of network servers, generally 14, a plurality of network clients, generally 15, and connections to other local area networks, or wide area networks, schematically represented by the cloud 16. In addition, the central node 10 may be connected to a second LAN 17 which includes a number of clients and servers not shown and may be connected to other LANs or WANs, as represented by cloud 18.

The central node 10 is connected by a point to point wide area network link 22 to leaf node 11. Leaf node 11 is coupled to a local area network 19 which includes network servers, generally 20, and network clients, generally 21.

Central node 10 is also connected through a switched wide area network communication link 23 to leaf node 12. Leaf node 12 is connected to a local area network 24 which includes a network server 25, and network client 26. Also, the LAN 24 may be connected to a "protocol island", generally 27, which may include a number of devices which execute a protocol that is not handled by resources on the central node 10. Thus, packets from the protocol island 27 are not routed by the multiprotocol router at the central node 10.

According to the present invention, the central node 10 includes a Smart Filtering manager 28, leaf node 11 includes a Smart Filtering agent 29, and leaf node 12 includes a Smart Filtering agent 30. The Smart Filtering manager 28 monitors data packets received across the communication links 22 or 23, to learn characteristics of the remote networks 19 or 24, respectively. The manager produces traffic management messages in response to the learned characteristics, and forwards the traffic management messages to the Smart Filtering agents 29 and 30 on the leaf nodes 11 and 12. The leaf nodes 11 and 12 respond to the traffic management messages to control the traffic which must be forwarded across the wide area links 22 and 23. For instance, the Smart Filter manager may detect certain network management packets which are generated by servers 20 on the LAN 19, which need not be forwarded to the central node every time they are generated. In response to this learned characteristic of the remote network, a traffic management message is sent to the leaf node 11 where the Smart Filter agent 29 implements a filter to prevent forwarding of such packets across the link 22.

Also, the Smart Filter manager 28 may detect certain types of packets which are forwarded from the central node 10 to the remote networks 19 and 24 through the leaf nodes 11 and 12, respectively, which do not provide new information to the remote networks. These messages need not be forwarded from the central node across links 22 and 23, provided traffic management messages are sent to the leaf nodes 11 and 12, where the Smart Filter agents 29 and 30 set up resources to spoof these traffic management packets for the remote networks.

Figure 2:
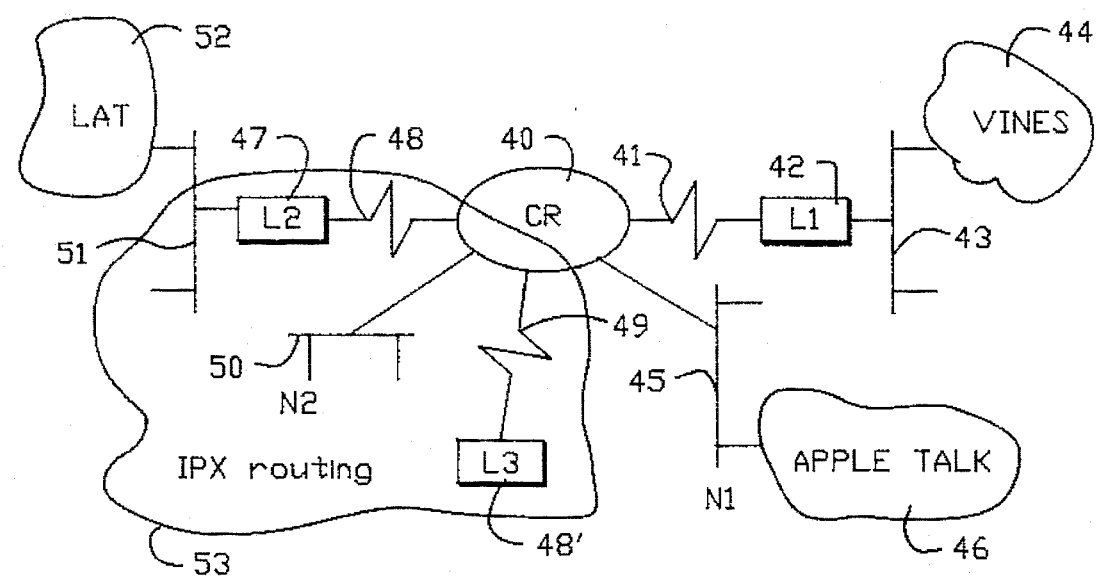
FIG. 2 is a schematic illustration of a boundary routing environment illustrating "protocol islands".

FIG. 2 provides a perspective view of the protocol island environment. In FIG. 2, central router 40 is connected across a WAN link 41 to leaf L1 (42). Leaf L1 is connected to a LAN 43 to which a VINES network 44 is attached. The central router 40 is also connected directly to network N1 (45). Network N1 is coupled to a group 46 of workstations which execute the AppleTalk protocol. The central router 40 is also coupled to a second leaf L2 (47) across a WAN link 48, to a third leaf L3 (48) across WAN link 49, and to a second directly attached network N2 (50).

The second leaf L2 is coupled to a network 51. Network 51 is coupled to a group 52 of terminals which execute the LAT protocol. As illustrated in the figure, the second leaf L2, the third leaf L3, and the second attached network N2 all operate in an IPX routing environment represented by cloud 53. Protocol islands exist in the VINES group 44, the AppleTalk group 46, and the LAT group 52. These protocol islands are networked topologies that are always confined to a single leaf network and have no interconnection needs with other leaf networks or the central router 40.

The IPX routing cloud illustrates that the domain of IPX routing may include an entire leaf network 48, or a partial leaf network, such as the network 51 connected to the second leaf L2. Thus, the multicast and broadcast traffic generated by the protocol islands 44, 46, and 52 need not be communicated across the wide area links 41, 48, and 49, because they would simply be discarded at the central router 40, so long as it is running strictly as a router for the particular port on which they are received. For example, in the leaf network 51 above, all LAT broadcast and multicast packets would leak to the central router 40 and be discarded there, because the central router would only be doing IPX routing over the port connected to link 48. This type of traffic is the kind of WAN overhead that should be removed using the Smart Filtering of the present invention.

Figure 3:
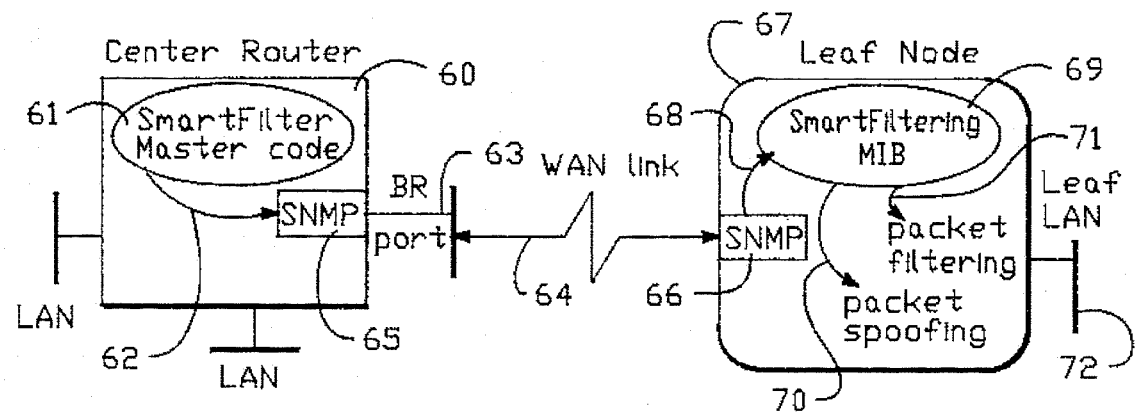
FIG. 3 is a more detailed schematic diagram of a Smart Filtering system according to the present invention.

FIG. 3 illustrates the basic structure for implementing the Smart Filter master and Smart Filter agent. The widely applied Simple Network Management Protocol SNMP is used as one example of the basic transport mechanism. In FIG. 3, the central router is represented by box 60. Within the central router 60, Smart Filter master code 61 is implemented, which includes an interface 62 to the SNMP transport mechanism 65. The SNMP transport mechanism 65 is coupled to the port 63. Port 63 is connected to a WAN link 64. This WAN link 64 is connected to the SNMP transport mechanism 66 in the leaf node 67. The SNMP transport mechanism 66 is linked by interface 68 to Smart Filtering agent code 69, which includes an SNMP management information base MIB. The Smart Filtering agent 69, in response to information in the MIB, performs packet spoofing 70 and packet filtering 71 for the leaf LAN 72.

Figure 4:
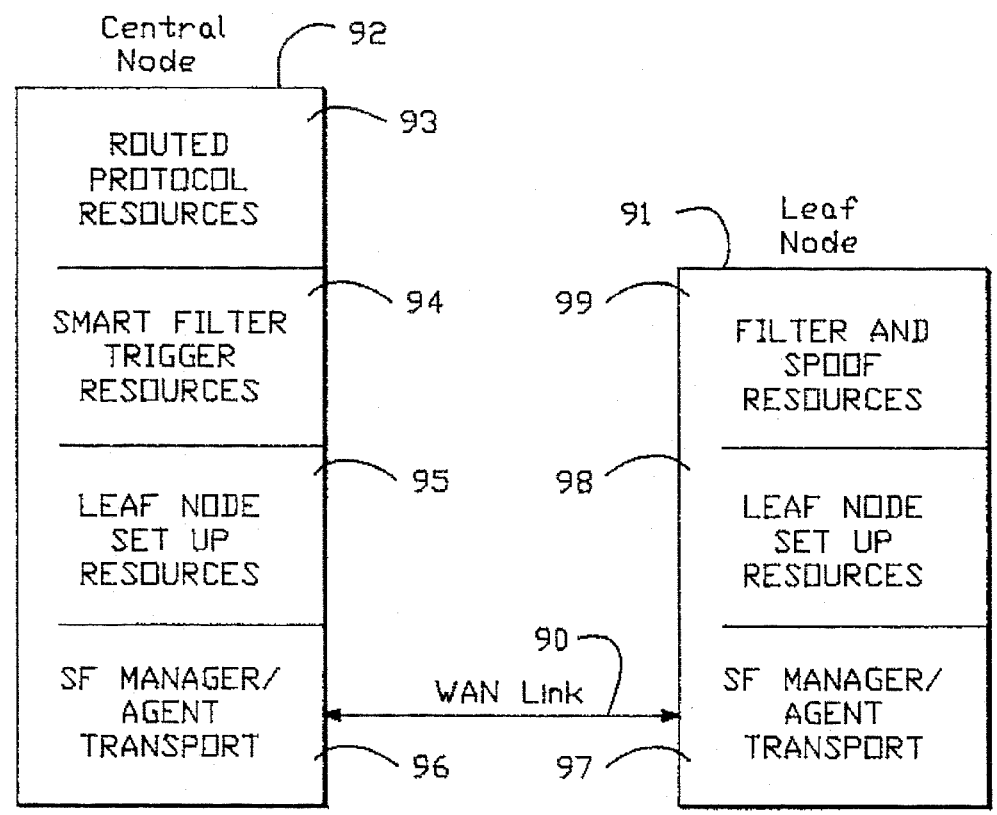
FIG. 4 is a schematic diagram of resources on the central node and leaf node executing the Smart Filtering protocol according to the present invention.

Although an actual implementation may not be a strict layering, these resources can also be illustrated as shown in FIG. 4. In particular, a wide area link 90 interconnects a leaf node 91 and a central node 92. The central node 92 includes routed protocol resources 93 for routing a variety of protocols in a network. Coupled with the routed protocol resources 93 are Smart Filter trigger resources 94. These resources may be embedded within the routed protocol resources 93, or separately implemented, depending On the particular software architecture utilized. Coupled with the trigger resources 94 are leaf node setup resources 95. These resources determine, based on the trigger resources 94, what actions to delegate to the leaf node 91 for filtering and spoofing.

Coupled with the leaf node 91 set up resources 95 is a Smart Filter manager/agent transport mechanism 96. This mechanism provides for transport across the WAN link 90 to a Smart Filter manager/agent transport module 97 in the leaf node 91. The transport provides for communication of messages concerning traffic management to the leaf node 91 set up resources 98, which are utilized by the filter and spoof resources 99 to manage traffic across the WAN link 90. As discussed above, SNMP with MIB objects is one mechanism which may be used for this transport. Alternatives include IP User Datagram Protocol (UDP) with the UI command/ parameter conventions, the Transmission Control Protocol (TCP), and specially designed protocols.

In one implementation of the present invention, the central node 92 is a multiprotocol router which includes the boundary routing system architecture for selected ports. The leaf node 91 is a remote interface for the central node 92 which forwards packets that are addressed to the interface on the central node for the leaf network across the WAN link 90 to the central node for routing, and forwards packets received across the WAN link 90 which are not addressed to the leaf node 91 to the attached network. The filter and spoof resources are utilized to control the multicast and broadcast background traffic which is not necessary for communication across the WAN link 90 to the central node 92.

Figure 5:
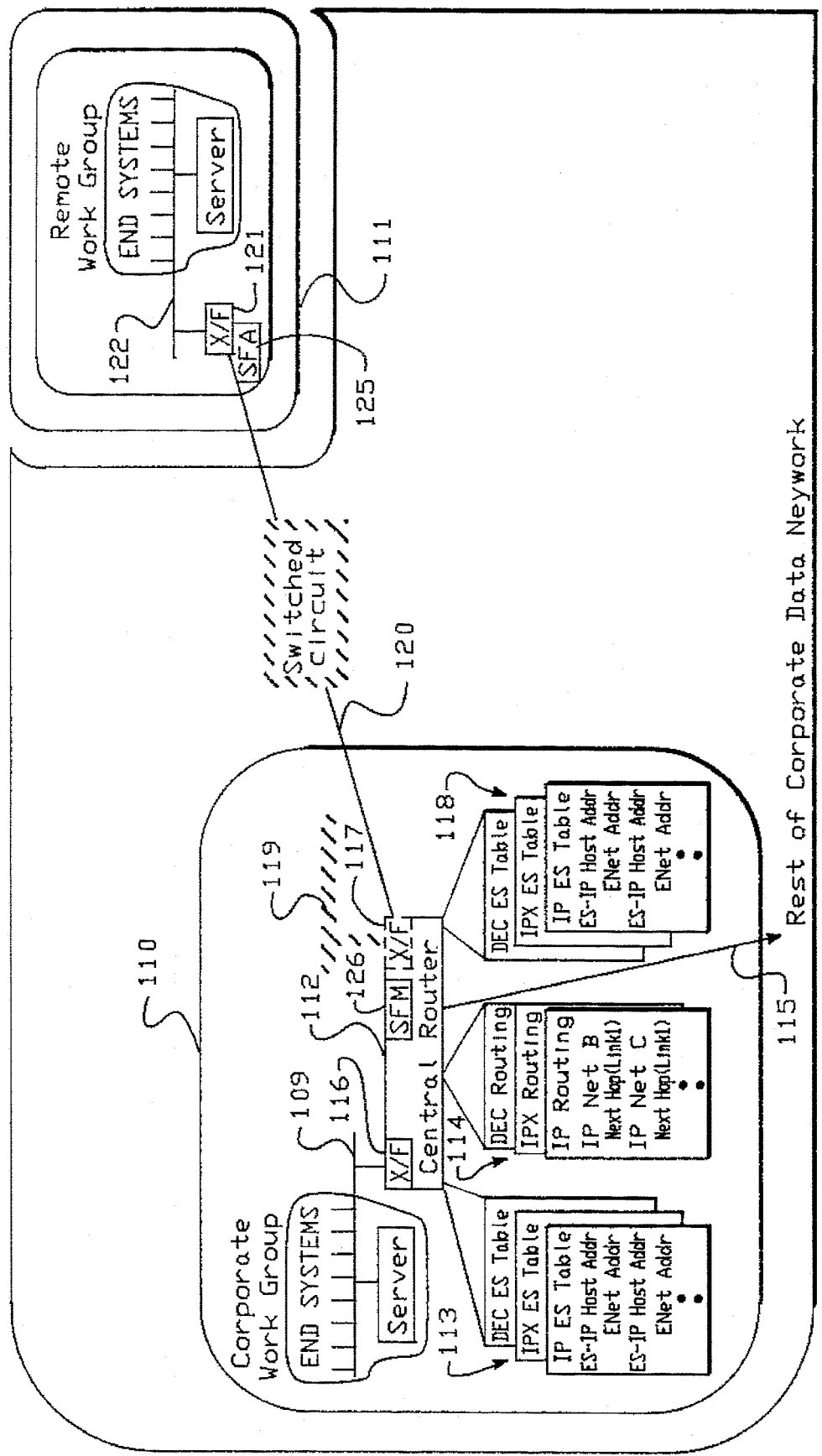
FIG. 5 is a schematic diagram of a boundary router system according to the present invention.

The boundary router systems architecture is illustrated in FIG. 5, connecting a first network 110 to a second network 111. The first network 110 includes a first LAN 109 which includes a plurality of end systems and a server, and may be interconnected to other LANs using intermediate systems (not shown) known in the art. Coupled to the LAN 109 is a central router 112. The central router 112 is an intermediate system in the network which provides network resources serving higher level protocol suites, which, in one unique embodiment, constitute routing resources. As such, the central router 112 maintains end system directories 113 for the local LAN 109 and global routing information 114 to serve the routing functions according to the higher level protocol suites. Thus, the end system directories will include DEC end system tables, IPX end system tables, IP end system tables, and others to serve other protocol suites that are operating in the network 110. The central router 112 may also be coupled to other portions of the corporate data network as schematically illustrated at arrow 115.

The central router 112 includes a local interface 116 which serves the local LAN 109 providing access to the network resources within the central router 112 to end systems on LAN 109. The central router 112 could also interface to other local LANs as well. In addition, the central router 112 includes a remote routing interface 117, which provides an interface to the network resources for end systems in the remote network 111. In support of the remote interface 117, the central router 112 maintains end system directories 118 serving the higher level protocol suites in the remote network 111. A Smart Filtering manager 126 is included in the resources of the central router 112.

As illustrated schematically by the hatched symbol 119, the remote network 111 appears to the end systems in the local LAN 109 as if it were a LAN connected locally to the central router 112. This appearance is maintained across a communication link 120, which may use telephone or other dial up lines, leased lines, satellites, wireless systems, or other communication media, to a routing adapter 121, which is coupled to the remote network 111. A Smart Filtering agent 125 is included in the resources of the remote interface 121. The remote network 111 includes a remote LAN 122 to which a plurality of end systems and a server may be connected as known in the art. In addition, the LAN 122 may be coupled to other LANs in the remote network 111 through intermediate systems (not shown) as known in the art. The routing adapter 121 provides means for extending the remote routing interface 117 transparently to the network 111 across the communication link 120. From the perspective of the remote network 111, the routing adapter 121 provides the same functionality as a router, while it operates independent of the higher level protocol suites.

Figure 6:
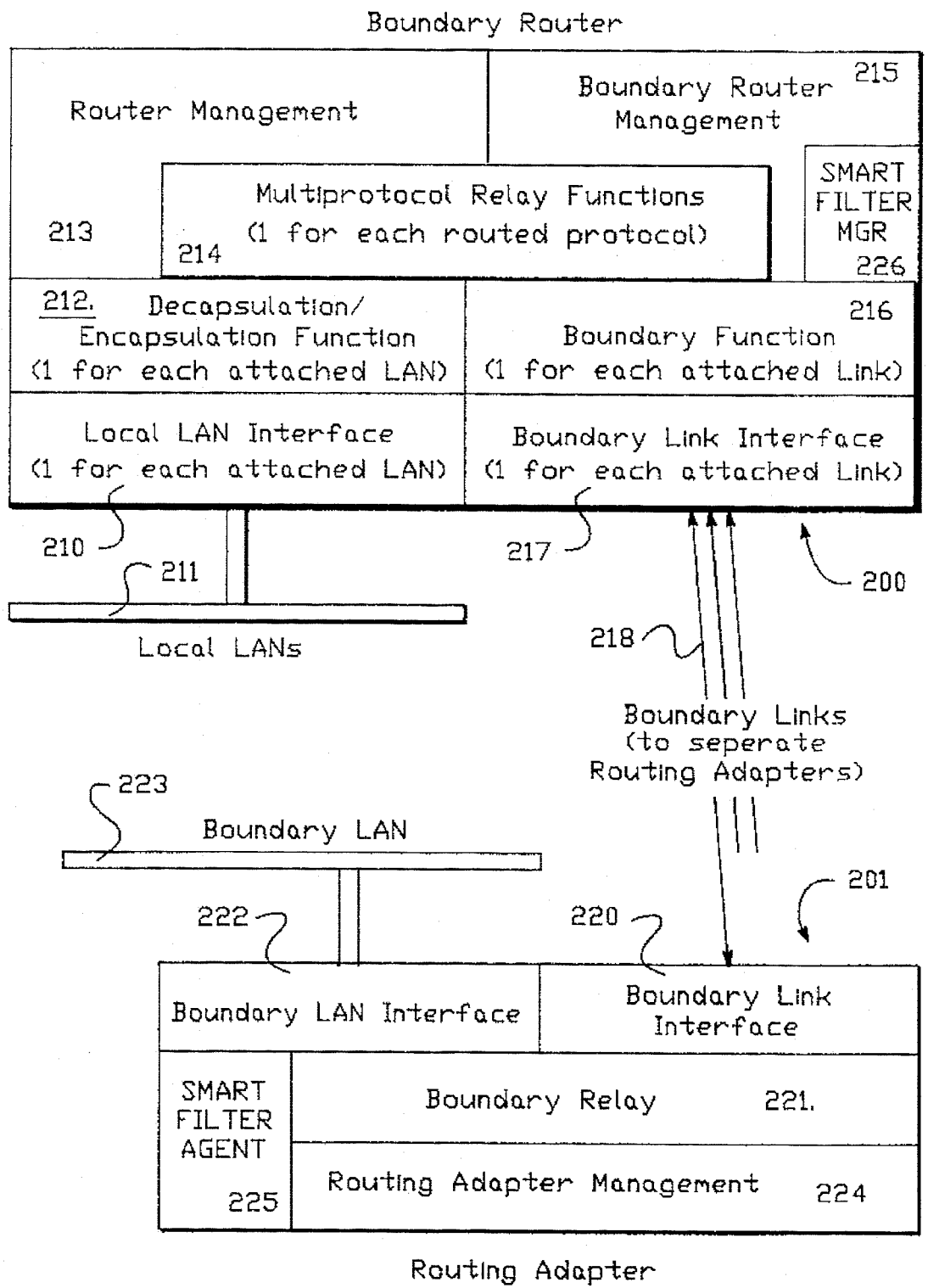
FIG. 6 is a schematic diagram of the resources of a boundary router central node and leaf node according to the present invention.

FIG. 6 illustrates the functional design of a boundary router (generally 200) and a routing adapter (generally 201).

When a single boundary LAN 223 is attached to the routing adapter 201, as illustrated in FIG. 6, the combination of the routing adapter 201 and the boundary router 200 appears to users of the remote LAN to be an end system on remote LAN, just like a normal router.

A central router includes at least one local LAN interface 210 for attachment to a local LAN 211. There is one local LAN interface for each attached LAN, as indicated in the figure. Each local LAN interface will be given a LAN address for use by the routing resources on the central router. Coupled to the local LAN interface is a decapsulation/encapsulation function 212, also one for each attached LAN. The decapsulation/encapsulation function 212 is coupled to router management 213 and multiprotocol relay 214 functions which are implemented for each routed protocol. Extensions to the central router to serve the remote network include boundary router management 215, a boundary function 216, and a boundary link interface 217. The boundary link interface 217 is connected to a boundary link 218 which provides communication with a boundary link interface 220 on the routing adapter 201. The boundary link interface 220 is coupled to a boundary relay function 221 and through the relay function 221 to a boundary LAN interface 222. The boundary LAN interface 222 is coupled to the boundary LAN 223. Also, routing adapter management logic 224 is coupled to the boundary relay 221 for performing management functions.

Thus, a central router contains all the logic of a multi-protocol router (such as NetBuilder II, available through 3Com Corporation, Santa Clara, Calif.) plus boundary functionality for the boundary links that interconnect the boundary router to the routing adapter. The additional functionality consists of boundary router management 215, boundary function 216, Smart Filter manager 226, and the boundary link interface 217.

Boundary router management 215 provides the equivalent set of functions for the boundary LAN(s) 223 as router management 213 provides for the local LANs 211. It also assists in the management of the boundary link 218 and routing adapter 201.

The boundary router management 215 is responsible for maintaining the boundary LAN end system directories for the linked boundary LANs just as the router management function 213 maintains a local LAN end system directory for its attached local LANs.

For attached local LANs, the local LAN end system directory is maintained through protocol frame exchanges between the router management function 213 and end systems attached to the local LAN 211. These protocols are termed End System to Intermediate System (ES-IS) protocols. Typically, each higher level protocol supported by the router has its own ES-IS protocol.

The boundary router management function 215 supports the same ES-IS protocols as routing management function 213. Each boundary LAN end system directory is maintained through protocol frame exchanges between the boundary router management function 215 and end systems attached to the remote boundary LAN 223.

The flow of frames from the boundary router management function 215 is initiated by the boundary router management function 215 passing the ES-IS protocol messages directly to the boundary function 216 for forwarding on to the boundary LAN end systems. The reverse flow of ES-IS frames from the boundary LAN end systems to the boundary router management function 215 is also supported.

The boundary router management function 215 is also responsible for facilitating the management of linked routing adapters 201 by allowing the same level of visibility and control of the linked boundary LAN(s) 223 as is provided by the router management function 213 for the attached local LANs 211. Also, extended visibility and control of the boundary links 218, interfaces 217, etc. can be provided.

All management requests, responses, etc., are initially received by the router management function 213. Router management frames from attached local LANs 211 are forwarded to the router management function 213 in a boundary router just as they would be in a regular router. As is seen below, the same is true for router management frames from linked boundary LANs 223, because a routing adapter 201 forwards management frames received on the boundary LAN 223 across the boundary link 218 to the boundary router 200.

The boundary router management 215 handles the management requests, responses, parts of requests, etc., having to do with the boundary LAN 223 (e.g., determining/knowing the boundary LAN type—ETHERNET, TOKEN RING, or FDDI). Boundary router management 215 gathers, sets, and changes remote boundary LAN information by sending/receiving frames to/from the routing adapter management function 224. Likewise, it can manage other aspects of the boundary router/routing adapter domain (e.g., setting, changing, and gathering local/remote information about both ends of the boundary link).

The boundary function 216 is positioned between the multiprotocol router relay functions 214 and the boundary link interface function 217. There is one boundary function 216 and boundary link interface 217 pair associated with each boundary link 218. The multiprotocol router relay function 214 interfaces to each boundary function/boundary link interface pair separately. Each pair constitutes a uniquely addressed extended remote interface to the routing resources in the boundary router, which is transparently extended across the respective link 218 to the routing adaptor 201.

The boundary function 216 is responsible for providing the same interface as the encapsulation/decapsulation function 212 provides for an attached local LAN 211. This means that the multiprotocol relay function 214 does not distinguish between attached local LANs and linked boundary LANs.

The boundary function 216 is also responsible for encapsulating/decapsulating higher level protocol information to and from the format of the remote boundary LAN 223 (e.g., ETHERNET, TOKEN RING, or FDDI, etc.) just like an encapsulation/decapsulation function 212 does for its attached local LAN 211.

For encapsulation, the LAN specific frame format information of the boundary LAN 223 and the source address value for the remote interface to the boundary router is learned through local configuration information or through a protocol exchange between the boundary router management 215 and routing adapter management 224 in the linked routing adapter. The LAN frame destination address values are passed by the multiprotocol relay function 214 which obtains them from a boundary LAN end system directory maintained by boundary router management function 215.

In the boundary function 216, encapsulated frames are passed to/received from the boundary link interface function 217.

The boundary link interface function 217 is positioned between the boundary function 216 and the boundary link 218. The boundary link interface 217 works with its peer boundary link interface function 220 in the routing adapter 201 and is responsible for transmitting and receiving frames to and from the boundary link 218. The functionality of the boundary link interface 217 includes encapsulating/decapsulating the LAN frames within/from a protocol, like Internet's Point to Point Protocol (PPP) that indicates, among other things, if the 32 bit Frame Check Sum is PRESENT/NOT PRESENT, the LAN frame format, whether acknowledgements are required, etc.

Compression/decompression of transmitted/received frames may also be done by the boundary link interface function 220 using any of a variety of compression protocols.

During physical link transmission/reception across the boundary link 218, the boundary link interface 220 adds a delimiting protocol like ISO 3309. During physical link reception, the frame must be reconstructed from the delimiting protocol and invalid frames discarded (e.g., frames with a bad frame check sums).

A routing adapter functions independent of the protocol suites encapsulated in LAN frames received/transmitted across boundary LAN 223 and link 218 to which it is attached. The routing adapter functionality consists of boundary link interface 220, boundary LAN interface 222, boundary relay 221, Smart Filter agent 225, and routing adapter management 224.

The boundary link interface function 220 is positioned between the boundary link 218 and boundary relay function 221. The boundary link interface 220 in the routing adapter 201 works with its peer boundary link interface function 217 in the boundary router 200 and is responsible for transmitting and receiving frames to and from the boundary link 218.

The functionality of the boundary link interface 220 is essentially identical to the boundary link interface 217 in the boundary router 200 as described above.

The boundary LAN interface function 222 is positioned between the boundary LAN 223 and boundary relay 221. The boundary LAN interface 222 is responsible for transmitting and receiving frames to and from the boundary LAN 223. The functionality of the boundary LAN interface 222 is the same as that of the equivalent function in a router and includes the following:

1. handling the physical and data link protocols, etc., as defined by the boundary LAN 223;
2. transmitting frames relayed by boundary relay function 221; and
3. passing valid received LAN data frames to the boundary relay function 221 which have a destination address within a programmed set of addresses including the address of the extended remote interface to the boundary router, or group address(es) set by routing adapter management function.

The boundary relay function 221 includes the adaptor's frame relay logic and operates independent of higher level protocol suites. The frame relay logic of a routing adapter 201 is defined by the following two rules.

1. Any frame passed from the boundary LAN 223 to the boundary relay 221 is forwarded to its boundary link interface 220 unless link 218 is not operational. In this case, it may be network management frame and it is passed to the routing adapter management function 224. This allows the routing adapter to be managed locally when the link is not operational. For instance, the routing adaptor management 224 may respond to management frames which request an attempt to re-open a link, such as by attempting re-dials on dial links.
2. Any frame received from its boundary link interface 220 is forwarded to the boundary LAN interface 222 unless its destination equals the routing adapter's LAN address. In this case, it is a network management frame from the boundary router management function 215 and it is passed to the routing adapter management function 224.

Routing adapter management 224 maintains local configuration information such as the LAN type of the boundary LAN 223 and the multicast destination addresses to be received.

Also, the routing adapter management 224 operates as the agent of the boundary router management function. As such, it is responsible for processing and responding to management requests, responses, etc., received from it.

Further, the routing adapter management 224 is responsible for processing and responding to management requests, responses, etc., received from end systems on the boundary LAN 223 when the boundary link 218 is not operational.

Smart Filtering in a Boundary Routing Configuration

In Boundary Routing, packets without new, useful information crossing the WAN link are considered overhead. Such packets go over the WAN link but get discarded eventually without affecting any network function. Filtering out these packets from the WAN link results in significant realized bandwidth savings.

To identify packets to be filtered, consideration will be given to traffic generated from either side of the WAN link.

It is not necessary to filter every packet that can possibly be filtered, but rather, the focus is placed on maximizing WAN link bandwidth saving. That is, the system concentrates on traffic that is voluminous in nature.

Basically there are two types of packet that can be reduced or eliminated. The first type of packets include periodic broadcast packets generated by routing protocols. These are router-to-router, end_system-to-router packets that are periodic and/or broadcast/multicast in nature.

The Smart Filtering mechanism will take advantage of the fact that wherever the contents of these repetitive packets remain the same for a long duration (which is typically the case for many of these packets in a stable network), the repetition can be avoided or filtered out and be compensated for by other mechanisms that do not involve sending packets cross the WAN link.

The second type of packets which are reduced by Smart Filtering include packets generated by "protocol islands". Even in a Boundary Routing environment, it is possible for "protocol islands" to exist. These would be network topologies that are always confined to a single leaf network and have no interconnection needs with other leaf networks or the central router.

Generally, techniques used to reduce WAN overhead can be categorized as follows:

Set up packet filters. This can be applied to any type of packets regardless whether they are being routed or not.

Set up router/service policies on either side of the WAN link. This technique requires knowledge of routing protocols from both sides of the WAN link.

Use a routing protocol that does incremental updates instead of periodic updates. Unfortunately, most routing protocols do not do incremental updates.

Set up static routes/services to eliminate the periodic broadcast packets. This may not sit well with an ever-changing network since static entries make network synchronization harder to achieve. If human intervention is required to maintain those static entries, it will be cumbersome and exert administrative burdens.

"Spoofing" packets in place of the periodic protocol packets. This may be needed when a network protocol (e.g., IPX) depends on those periodic packets to maintain network visibility. Without receiving those periodic packets, an IPX device will not recognize the existence of the network. Thus spoofing becomes necessary to keep the network visible to these devices.

A solution to the "protocol island" overhead when not bridging in Boundary Routing port: make the leaf node discard all packets from these "protocol islands". In effect, the leaf nodes will pay attention to what protocols are being routed on the central router, and forward only packets from these routed protocols to the WAN link.

A combination of the techniques stated above may be employed to achieve the desired effect.

It is imperative for Smart Filtering to locate the right moment for activating or deactivating the filter logic. The central router will be responsible for this intelligence. The criteria for activating Smart Filtering on a port will be:

The port has been defined as a Boundary Routing port.

Smart Filtering is enabled.

The associated WAN link is up and fully operational.

When fully operational, Smart Filtering will detect "triggers" and take actions accordingly. A "trigger" is an event specific to a protocol or a circumstance where a Smart Filtering action is warranted. Detailed examples can be found in subsequent sections of this document.

Deactivation or, sometimes, reactivation of Smart Filtering occurs when:

The associated WAN link is down and becomes non-operational.

Smart Filtering is disabled on the port.

The port is no longer defined as a Boundary Routing port.

When fully operational, port configuration may be changed so that a specific protocol is no longer being routed at the central site. This is one of the trigger events that warrants Smart Filtering action to be taken. In this case, Smart Filtering for that specific protocol should be deactivated accordingly.

The filtering intelligence is built into the central site router, and the leaf node merely follows directives issued by the central router. When Smart Filtering is operational, the central router will detect trigger event, formulate the actions required to be taken and "delegate" parts of the action to the leaf node. This "delegation" will be carried out by a transport mechanism described below.

The Smart Filtering mechanism includes an intelligent process at the central router. The process uses SNMP to send requests over the WAN link to the leaf node. The instrumentation of the Smart Filtering MIB on the leaf node would execute the requests from the central router, thus achieving the desired filtering effect. Most of the information needed will be learned in run-time, and necessary adjustments done dynamically according to that information. The only static information is a user interface enabling/disabling option for Smart Filtering at the central router.

Figure 7:
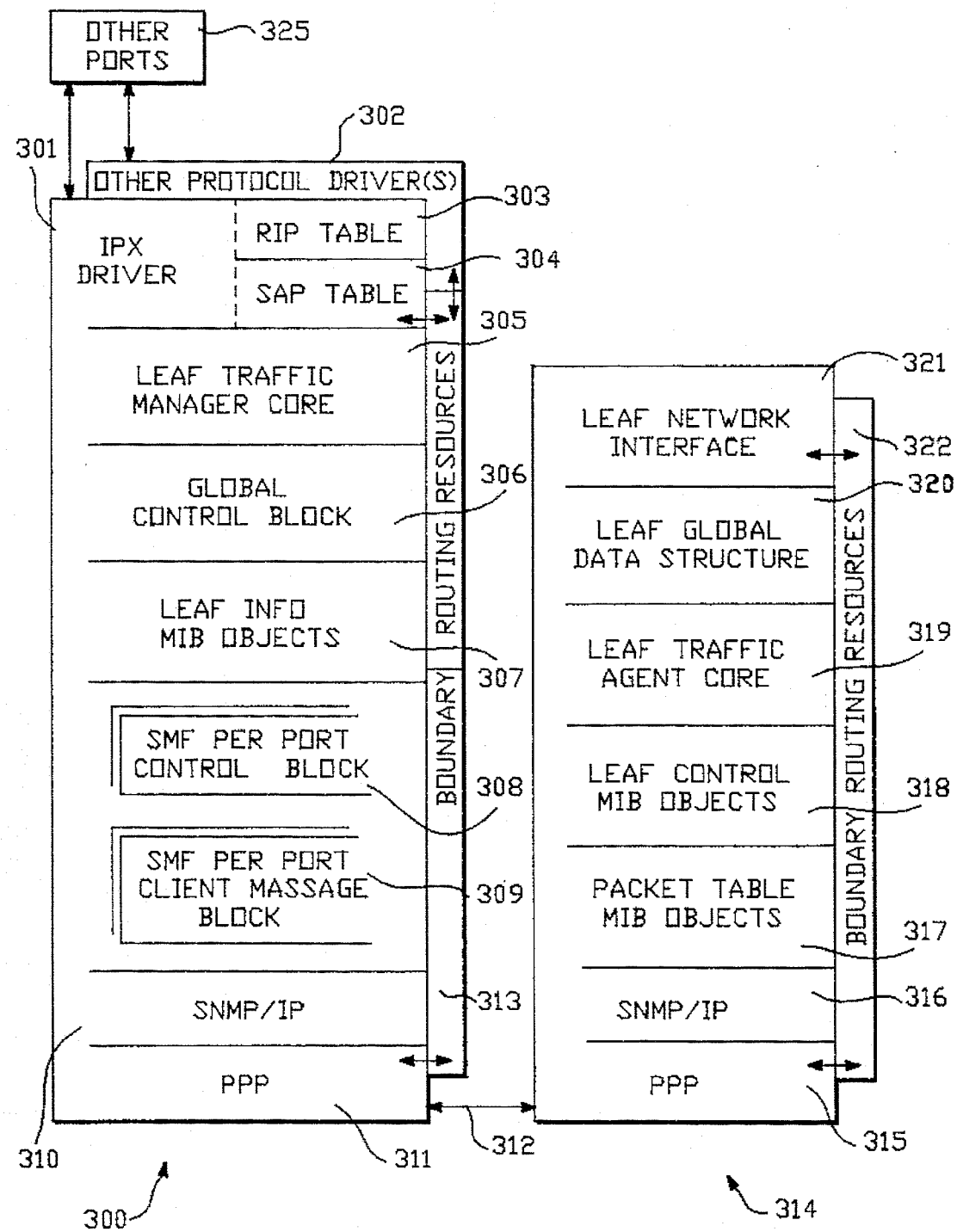
FIG. 7 is a more detailed schematic diagram of the resources executing Smart Filtering according to a preferred embodiment of the present invention.

FIG. 7 provides a diagram of the central node and leaf node emphasizing the Smart Filtering manager and Smart Filtering agent components according to a preferred embodiment adapted to control traffic generated by the IPX protocol. After discussing FIG. 7 to provide a heuristic perspective, implementation details of a particular embodiment are described.

The central node 300 includes an IPX driver 301, and other protocol drivers, generally 302. The IPX driver 301 includes an RIP table 303 and an SAP table 304. The leaf traffic manager core 305 is software which is embedded in the IPX driver 301 to detect trigger events for the Smart Filtering manager. The Smart Filtering manager includes a global control block 306, leaf information MIB objects 307, a Smart Filter per port control block 308, and a Smart Filter per port client message block 309.

These components utilize a transport mechanism based on SNMP over the internet protocol (IP) as indicated at block 310. The SNMP block 310 is a client of a point to point protocol (PPP) block 311, which manages the wide area link 312. Also in the central node 300 are boundary routing resources 313 such as that described above with respect to FIG. 6.

The central node 300 is also coupled to other ports (generally 325) and includes similar resources to support such ports as necessary.

The leaf node, generally 314, includes a PPP driver 315 connected to the WAN link 312. The SNMP over IP transport mechanism 316 complements a similar component (310) on the central node 300. The SNMP transport supports packet table MIB objects 317 and leaf control MIB objects 318. Coupled with the MIB objects 318 is a leaf traffic agent core 319 which manages the filtering and the spoofing based on the information in the MIB objects 318, a leaf global data structure 320 used for configuring the leaf traffic agent core 319, and a leaf network interface 321. The leaf network interface 321 is also coupled to boundary routing resources 322, such as those described above with respect to FIG. 6.

The implementation of Smart Filtering feature on the central router is named SFM for Smart Filtering Manager. This component will start a process to handle the following tasks:

management of the per-pod Smart Filtering control tables.

recognize Smart Filtering "trigger" events and react to them.

interfacing with the SNMP process on behalf of each Smart Filtering port.

By cooperating closely with the leaf node Smart Filtering implementation, SNMP process, and protocol modules like IPX modules, the SFM component will achieve the desired effect in saving WAN link bandwidth.

An important data structure used by the SFM component will be a per-port control block (FIG. 7, element 308), called SFMCB for SmartFilterManager Control Block.

In addition to the per-port SFMCBs, a global control block (FIG. 7, element 306) is used to store general control information regarding the Smart Filtering operations as a whole.

The Smart Filtering process will be invoked by messages received in its mailboxes. It will process these messages in the order they have been received. Each message indicates an event requiring attention. The process will dispatch each message to the appropriate handling routine based on algorithms described in this section.

The algorithm used to establish a Smart Filtering port can be summarized as shown in FIG. 8.

The algorithm begins by determining whether the port is set up for boundary routing, Smart Filtering, and the link is up (line 1). If all three conditions are met, then the Smart Filter manager control block is initiated for the port (line 2). Next, Smart Filter manager registers as an SNL client to receive link status (line 3). Then, the manager sends an SNMP set "a3SfControl to enabled" request to the leaf node (line 4).

If there is no error in the SNMP response received (line 5), then a timer is started to allow establishing of initial routing information (line 6). Also, run time Smart Filtering operations are initiated (line 7).

However, if an error was received, or a timeout occurs before a response is received, then the Smart Filter manager control block is freed, and the algorithm is exited (lines 8 and 9).

If the port is not set up for boundary routing, Smart Filtering, and the link is up, the Smart Filter manager control block is freed, and the algorithm is exited (lines 10 and 11).

The run-time Smart Filtering operations can be described with the algorithm shown in FIG. 9.

The algorithm begins by determining whether the operations are starting up, or a port or protocol configuration has been changed. If either of these events has occurred, then an SNMP "set a3SfProtocolCtrl to (protocols enabled)" message is sent to the leaf node (lines 1 and 2). If the algorithm is starting up or routing information has changed, then the manager sends SNMP set request to establish necessary filters, and SNMP set request to establish packets to be spoofed on the leaf network. Also, dead station entries are removed when notified by the leaf node (lines 3–6).

The last three action items (lines 4–6) will largely depend on the protocol(s) being routed at the time when decisions are made.

The algorithm shown in FIG. 10 is used for shutting down the Smart Filtering function on a port.

The algorithm begins by determining whether the algorithm is set for no boundary routing or no Smart Filtering (line 1). If it has been set to either of these conditions, then an SNMP "set a3SfResetCtrl" request is sent to the leaf node, the manager de-registers from SNL and frees the Smart Filter manager control block, and exits (lines 2–4).

If the link is detected as down, then a timer is started in case the link becomes active again (lines 5 and 6). If the timer times out, then the SF Smart Filter manager control block is disabled (lines 7 and 8).

The algorithm for handling exceptions is shown in FIG. 11.

The algorithm begins when an SNMP request has timed out (line 1). If it has timed out, the request is re-sent until a predetermined limit of retries is reached (line 2). If the retransmit limit is reached, the Smart Filter manager control block is freed and the algorithm is exited (lines 3 and 4).

If the algorithm is out of resources or runs into a serious problem, then the manager sends an SNMP "set a3SfResetCtrl" request to the leaf node if possible, then frees the Smart Filter manager control block and exits (lines 5–7).

FIG. 12 provides an expanded pseudo-code outline of the run time Smart Filter manager operations for IPX. The algorithm runs if a RIP or SAP packet is received by the central node.

First, the algorithm determines whether the RIP/SAP packet is from a server on a local network (line 1). If it is, then the algorithm determines whether the RIP/SAP packet has been changed upon review of the RIP/SAP table in the central node. If it has been changed, then a changed RIP/SAP message is composed using the SNMP MIB structure (line 3). This message is forwarded to the boundary routing and Smart Filtering ports on the central node (line 4). The changed RIP/SAP message is sent to the leaf nodes (line 5). The received RIP and SAP packet is sent to those pods not configured for boundary routing or Smart Filtering, if appropriate, according to the protocol (lines 6 and 7).

At the leaf node, the RIP/SAP packet used for spoofing is updated with the changes (line 8).

If there was no change in the RIP or SAP packet received from the server on a local network, then the RIP or SAP packet is sent only to those ports not configured for boundary routing and Smart Filtering (lines 9–11).

If the RIP/SAP packet received by the central node is from a server on the leaf network (line 12), then the RIP and SAP tables on the central node are updated (line 13). Next, the MAC address of the server originating the RIP/SAP packet is determined (line 14). Then, a filter message is sent to the leaf node from which the packet was received with the MAC address of the server that originated the packet (line 15). At the leaf node, broadcast packets having a source address equal to the MAC address of the server are filtered in response to the filter message (lines 16 and 17).

The SFM component will interface with the SNMP process for the following tasks:

compose SNMP requests for sending to the leaf nodes.

receive SNMP responses and react to them.

The SFM component will use a message interface for communicating with the SNMP process. The messages will contain necessary parameters either to assist composing an SMP request or to convey the result from an SNMP response.

After receiving a request from the SFM component, the SNMP process will prepare an SNMP request packet and spawn a process to wait for the response. The SNMP process will send a message (with result or error code) back to the SFM module when it receives a response.

The SFM component will interface with its clients for recognition and reaction to the trigger events. A client message interface (FIG. 7, element 309) supports operations, including port enabling/disabling, protocol routing decision changes, flushing a specific packet type, new spoof packet, end of a spoof "batch", and host address to be filtered on leaf network.

The Smart Filtering trigger events can be summarized in the following categories:

1. Events that Activate or Inactivate the Whole Smart Filtering Feature on the Port These events including changes in the port control parameter and changes in the WAN link itself. Both types of changes could result in the disabling or enabling of the Smart Filtering feature on the port.

2. Events that Affect the Smart Filtering Operations Regarding Protocol Activation These events are changes made to the protocol activation on the Boundary Routing port. For example, if IPX routing is changed from enabled to disabled, all the IPX spoofing and filtering done on the leaf node would be stopped accordingly.

3. Protocol-specific Events that Warrant Adjustment Actions on Filtering or Spoofing These trigger events are protocol-specific situations that induce reactions from the Smart Filtering code. For example, in IPX routing, changes to the RIP or SAP tables because of new RIP or SAP packets received would indicate something needs to be done for Smart Filtering operations. Another example is flushing the IPX tables.

Since IPX protocol modules have knowledge about these trigger events, it is natural and most efficient for the IPX components to convey this knowledge to the SFM module. For example, when composing the RIP or SAP packets, the IPX modules have the knowledge of whether there is change made from the last processing. This piece of knowledge should be communicated to the SFM module as a trigger event so that SFM would react to it.

The trigger events listed above will be communicated to the SFM component via the client interface described above.

The Management Information Base (MIB) object group supported by the SNMP transport will contain these objects:

The enable/disable Smart Filtering object—this object can also be used to determine if the leaf node support Smart Filtering at all.

The network protocols being routed at the central router.

Whether bridging is enabled on this link or not.

The packets to be "spoofed" by the leaf nodes, and intervals between those packets—this should be an aggregate object, a table should be defined with multiple packet entries.

Other information, e.g., extra information needed in setting filters, policies, and masks on the leaf nodes—information not available through existing MIB object groups.

Communication between the central router and its leaf nodes are carried out as SNMP operations. The way SNMP operates also reaffirms the Master-Slave relationship mentioned above. In terms of SNMP model, the central router is the SNMP management station and the leaf nodes are SNMP agents.

Filtering operations are set up by the Smart Filtering system automatically. All the necessary trigger events and routing information will be learned in run time without human intervention. The only thing that may require user involvement is whether to activate the Smart Filtering feature on the Boundary Routing port.

SNMP usage assumes IP configuration available on both sides of the WAN link. However, an addressless protocol is provided for non-IP users as described below with reference to FIG. 13.

The Appendix provides the MIB definitions used in the Smart Filtering feature.

The Smart Filtering MIB contains a total of three object groups. Two of them are used to allow the central router to execute its commands via these objects to achieve the desired effects. A third group is used to allow the leaf node to notify the central router about information the leaf node has. The first two groups are implemented on the leaf node while the third group is implemented on the central router. Below is an overview of these objects. Control (FIG. 7, element 318)

This group of objects are used by the central router to control the following operations:

1. Activation of the Smart Filter operation.
2. Registration to the leaf node of the protocols enabled on the Boundary Routed port at the central site, so that the leaf node would apply filters to properly discard traffic generated from "protocol islands".
3. Flushing all packet entries.

There is also a subgroup of objects which conveys information pertinent to the Smart Filter operations that have been recorded by the leaf node. The information includes status, failure reasons, and accounting data.

Packet Table (FIG. 7, element 317)

This group of objects is used by the central router to establish spoof packets for the leaf node so that the leaf node can transmit these packets periodically to the leaf network. There is also a subgroup that is used to establish filters on the leaf node, so that the leaf node will discard specific broadcast packets from stations on the leaf network.

There are three tables in this group:

1. Packet Type Table—This table contains all control parameters and information available for a specific packet type, e.g., IPX-SAP. Each row in this table represents a specific packet type and its associated data items. The central site can issue minimum number of commands to control all packets of the same type through this table.
2. Packet Table—This table contains the actual packets to be transmitted periodically by the leaf node. Each row in this table represents a packet to be transmitted.
3. Address Table—This table contains a list of the stations on the leaf network.

Leaf Information (FIG. 7, element 307)

This group of objects is used by a leaf node to report back to its central router about important information the leaf node has acquired. Only urgent information like error conditions or dead servers is reported. Other information like accounting or statistics may be included.

The design of the Smart Filtering MIB allows for the flexibility in creating a packet entry. Usually a MIB table entry is created by selecting an index for the table entry, and then setting the "entry.status" field of the entry specified with the index. If an agent cannot satisfy the request of creating the entry specified, e.g., creating an existing entry or simply out of resources, a response with error code will be returned. Then it is up to the manager to attempt another index.

In terms of Smart Filtering implementation, the entry creation scheme stated above implies the central router will keep track of the table usage,: acquire the next available index for entry creation, and manage the packet table through these indices. This method of entry creation introduces extra SNMP traffic in that the central router needs to acquire a usable index before entry creation, or risk being rejected due to invalid index or out of memory in entry creation. The central router implementation could also become complicated if it needs to keep track of the table usage, maintaining detailed knowledge about the packet table on the leaf node. Obviously, this method does not scale well with a large number of leaf nodes.

But, in reality, the above entry creation scheme may not be needed in some Smart Filtering operations. For example, in spoofing IPX SAP packets to the leaf network, the central router is asking the leaf node to spoof all SAP packets that would have been generated by the central router if Smart Filtering is not in effect. In enabling or disabling the Smart Filtering feature, the central router is interested in enabling or disabling the spoofing of all SAP packets, not just a particular spoof packet entry.

The same is true for updating spoof packets when new information is available. Since the leaf node does not understand the content in these spoof packets (no IPX protocol stack available on the leaf), it cannot just update the packet entry affected. Instead, all SAP spoof packets will be updated as a "batch". In this sense, table access is really on a "batch" basis, i.e., all SAP spoof packets are grouped into one batch. By using this model, the Smart Filtering implementation is simplified and the SNMP traffic on the WAN link reduced.

The Smart Filtering MIB is designed to facilitate the "batch" model described above. When creating spoof packet entries on the leaf node, the central router will start creating spoof packet entry from the very first index, that is, one. If there are more packets to spoof, the central router will use the next higher index, and so forth.

One of the benefits of using this model is relieving the central router of the need to keep track of detail usage of the packet table. And by doing operations in a "batch" mode, SNMP traffic is reduced to the minimum. For example, when flushing all SAP packets in the spoof table, the central router can use one SNMP request to remove all SAP spoof packets without specifying any index. If this method is not used, multiple SAP request/response may be needed.

IPX Support

To filter IPX broadcast traffic, the SFM component will take appropriate actions for each type of broadcast traffic.

The user may be able to configure the mode of operation for RIP and SAP broadcast by specifying whether the routing/service update should occur through periodic updates or through non-periodic, incremental updates.

If the setting of RIP/SAP control is non-periodic, then no spoofing (and no Smart Filtering)is needed because RIP/SAP broadcast is now on an incremental-update basis. No further bandwidth saving can be realized from the Smart Filtering feature in this case. If the setting is Periodic, then the Smart Filtering feature will execute the operations described below.

The SFM component will set up the spoof packet table on the leaf node to start spoofing. Once the spoofing is started, the RIP and SAP update packets for the boundary routing port on central router will not go over to the leaf network. This can be achieved by making IPX components consult with SFM before composing these packets.

When composing a RIP or a SAP update packet, the IPX protocol modules have the knowledge about whether there is anything changed from the previous processing. If there are changes, the IPX modules will notify SFM module to flush the existing spoof packets on the leaf node, and then start the spoof table with new spoof packets.

If Smart Filtering is stopped, e.g., by changing RIP/SAP control to non-periodic when spoofing is already in progress, the SFM module could use just one SNMP Set request to clear the spoofing operation. By setting the a3SfFlushCtl object to the corresponding packet type to be flushed, the SFM module notifies the leaf node to stop the spoofing operation for the packet type identified and clear up spoof table accordingly. Note that RIP and SAP spoofing can be controlled and flushed separately.

The SFM component will set up filters on the leaf node to filter RIP and SAP broadcasts from all IPX servers on the leaf LAN. The a3SfAddrTable object group in the Smart Filter MIB will be used to facilitate this task. The Smart Filter agent code on the leaf node will have built-in filters to discard all RIP or SAP broadcast generated from the IPX servers identified by the a3SfAddrTable. The SFM component would fill the address table with server addresses learned from the leaf network.

When a new server comes up on the leaf LAN, its route/service broadcasts will go through the WAN link unfiltered. The IPX modules would learn about the new server from the broadcast packet received. After updating the route/service tables and checking against the receive policies, the central router would add the new server to the a3SfAddrTable on the leaf node. Thus the subsequent broadcasts from the new server will also be filtered.

The Smart Filter agent code on the leaf node will have a timer to keep track of all servers in the a3SfAddrTable. If the leaf node has not heard from a server for the normal time-out period, the server will be assumed "dead" and the SFM component needs to be notified of this information. The a3SfLeafInfo object group in the Smart Filter MIB will be used for the leaf node to notify the SFM component.

If Smart Filtering is stopped, e.g., by disabling the feature from the port control parameter, the RIP and SAP entries learned from the leaf network will be removed accordingly. The SFM component will also notify the leaf node to stop filtering RIP and SAP broadcasts from IPX servers on the leaf network.

A user can enable or disable routing control or flush the RIP table, the SAP table through the IPX service in user interface. When this happens, the SFM needs to be notified so it can stop the spoofing operations on the leaf node. The filtering operation on the leaf node also needs to be stopped, so broadcast traffic from IPX servers on the leaf network can be received by the central router.

Leaf Node Implementation

The implementation of Smart Filtering feature on the leaf node is named SFA for Smart Filtering Agent. This component is an instrumentation of most object groups in the Smart Filtering MIB on the leaf node. Through serving the SNMP requests, the SFA component will execute the directives from the central router, thus achieving the desired spoofing and filtering effect.

The SFA component will be implemented as a process. Most of the functionalities will be invoked through direct function calls under SNMP process context. Typically, the SNMP process would receive request packets from the WAN link and then dispatch the requests to functions registered in the MIB table. When the SFA component is done with the request, it returns control back to the SNMP process. The SNMP process then prepares the response packet with the result from the SFA component.

The SFA process is also responsible for running advertising timers for spoof packets and transmitting the packets to the LAN port when these timers expire.

The internal data tables will resemble the a3SfPkTypeTable, a3SfPacketTable, and a3SfAddrTable defined in the Smart Filtering MIB. In addition to those tables, a global data structure (FIG. 7, element 320) is used for general housekeeping of SFA component.

Address-less Transport

There is one special requirement of the SNMP Manager process needed by the Smart Filtering component. This is the ability for the SNMP Manager process to get SNMP requests to the leaf node without having any IP addresses configured on either the leaf node or the central node. In order to make the interface between the SNMP Manager process and its client as well as UDP, a special IP address is used to indicate to the IP layer that a certain packet was originated by the Smart Filtering component. When IP recognizes that IP address in the destination field, the interface parameter in the message from UDP is used to determine over which port the packet should be sent. In addition, a special IP address is placed in the source IP field and place an IP broadcast (all ones) address in the destination IP field. Finally, the IP component will place a special MAC address in the destination MAC address field. The leaf node, meanwhile, will recognize this MAC address as special and accept the packet. Since the destination IP address is broadcast, the packet will work its way up the protocol stack and be delivered to SNMP. After the SNMP component finishes processing the request, it will simply treat the packet normally, and return the request to the central node (remember, the destination IP address in this case will be the special IP address). The IP component in the leaf node (using the same code as the central node) will then recognize the special IP destination address and use the interface message parameter instead of the IP address in determining which port to send the packet out on.

When the SNMP agent receives a Smart Filtering request (the agent determines this by checking the destination IP address of the request. If it is 127.0.0.1, it is a Smart Filtering request), it places all ones in the source IP address field, and sets the interface parameter to the first HSS port on the box. Since this will be a leaf node, this port must be the port over which the request was received.

Neither the central node nor the leaf node need to know the other's IP or MAC addresses in this transport mechanism. The mechanism used to indicate to the lower protocol layers that a packet is a Smart Filtering packet is through the use of the destination IP address: if it is 127.0.0.1, the packet is a Smart Filtering packet.

FIG. 13 illustrates the actions taken by the lower layers. The sending side is shown in box 200 for an IP layer interface.

As illustrated in FIG. 13, one of the two processes snmp_to_udp(), or snmp_mgr_proc() prepares an SNMP message for delivery through the UDP interface to the internet protocol driver. In this process, the IP destination is set to 127.0.0.1, the IP source is set to all ones (0xffffffff), and the Smart Filtering MAC address is set to 0x080002001507. The interface value is set to the Smart Filter manager designated port. The IP protocol (block 200) picks up the message in the ip_transmit() process. If the IP destination is equal to 127.0.0.1, then the Smart Filter manager designated interface value in the message is used. Else, the interface value is determined by the IP destination address. Next, this process fills in the route information structure, which includes putting the number 127.0.0.1 into the IP source field, and putting all ones into the IP destination field. The next process, ip_tosubnet() picks up the packet and if the IP source address is 127.0.0.1, a special Smart Filtering MAC address is put in the destination MAC field. The process is then passed down to the transport mechanism across the link.

On the receiving side, the IP process is shown in block 201. The incoming packet will have the Smart Filtering MAC address. It will be recognized as the port's MAC address and passed up to the IP layer. The IP layer will recognize the broadcast destination of all ones, and pass the packet up to the UDP client. UDP will recognize the destination port which passes the packet up to the SNMP process, snmp_proc_req().

Conclusion

As discussed above, one of the challenges faced in the WAN environment is the optimal use of the WAN link bandwidth. As more and more Local Area Networks are being interconnected with WAN links, more of the WAN link bandwidth is used for periodic broadcast packets. Typically these packets contain a snap-shot of the network routing information. They are broadcast to the network at a certain interval to exchange and to update the routing information, and implicitly keep routing devices in synchronization with each other. In a stable network, the content of these packets broadcast from the same device would stay the same.

Since routing information being exchanged can be quite large, and the information can be proportional to the number of routing devices, the demand on WAN link bandwidth for these periodic packets can be substantial. Compared to a router-to-router setup, the Boundary Routing model exasperates this demand further by allowing more LAN-oriented broadcast traffic through the WAN link.

Smart Filtering is a solution proposed to reduce these periodic packets. By keeping these periodic packets to the minimum, the WAN link bandwidth can be better used for other network traffic. In addition to these periodic packets, the Smart Filtering process will also look for other types of packets that have no need to cross the WAN link.

The benefits of Smart Filtering operation include:

WAN link usage is improved by removing unnecessary traffic from the link.

The intelligence is kept at the central router while the leaf node merely acts as an agent for executing directives from the central router. In this role, the leaf node remains protocol independent as much as possible.

On the central router, Smart Filtering is scalable to accommodate many leaf networks.

It is simple to implement.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

APPENDIX

Copyright 3Com Corporation 1994

```
--Smart Filtering MIB for general 3Com systems

A3Com-SmartFilter-r1-MIB DEFINITIONS ::=BEGIN
IMPORTS
        enterprises
            FROM RFC1155-SMI
        OBJECT-TYPE
            FROM RFC-1212;

a3Com                   OBJECT IDENTIFIER ::= { enterprises 43 }
brouterMIB              OBJECT IDENTIFIER ::= { A3Com  2  }
a3ComSmartFiltering     OBJECT IDENTIFIER ::= { brouterMIB 20 }
a3ComSfCtl              OBJECT IDENTIFIER ::= { A3ComSmart Filtering
1 }
a3ComSfPacket           OBJECT IDENTIFIER ::= { A3ComSmart Filtering
2 }
a3ComSfLeafInfo         OBJECT IDENTIFIER ::= { a3ComSmart Filtering
3}

RowStatus ::= INTEGER   {
                active (1),
                notInService (2),
                notReady (3),
                createAndGo (4),
                createAndWait (5),
                destroy (6)
```

This data type, which has the same semantics as the RowStatus textual convention used in the SNMPv2, is used to add and delete entries from a table. The table in this MIB allows a subset of the functionality provided by the RowStatus textual.

The table in this MIB allows a subset of the functionality provided by the RowStatus textual convention. In particular, row creation is allowed using only the createAndGo method. That is, when adding entries to this table, this object must be set to createAndGo(4). The instance identifier for this object will define the values of the columns that make up the index.

In the same PDU, the appropriate remaining columns of that row must be set as well. The agent will immediately set the value of the object to active (1) if the row is correct. If not, the agent will refuse the SET request and return an error code.

To remove an entry, set the value of this object to destroy (6). To modify an existing entry, it must be removed and another entry with the desired changes added.

The objects in the Smart Filtering MIB are set out below.

```
a3SfResetCtl    OBJECT-TYPE
    SYNTAX      INTEGER {
        other (1),
        apply (2)
    }
    ASSESS      read-write
    STATUS      mandatory
    DESCRIPTION
        "This object is used to reset the Smart
        Filtering operations on the boundary routing
        leaf node.  The agent should clear existing
        Smart Filtering operations, including both
        packet table and filter effects, when this
        object is set to apply (2)."
    ::= { a3ComSfCtl 1 } a3SfProtocolCtl OBJECT-TYPE
    SYNTAX      INTEGER
    ACCESS      read-write
    STATUS      mandatory
    DESCRIPTION
        "This object is used to indicate which
        protocols are enabled at the central site.
        The agent uses this information to forward
        traffic from enabled protocols to its WAN
        port.  The seven least significant bits in
        this integer are used to indicate whether or
        not a specific protocol is enabled at the
        central site.
```

If Bit 1 (i.e., the least significant bit) is set, that indicates the central site bridges packets over the WAN port connected to this leaf node, the agent will forward all packets regardless what protocols has been enabled.

If Bit 2 is set, that indicates the central site routes IP packets over the WAN port connected to this leaf node. If Bit 3 is set, that indicates the central site routes IPX packets over the WAN port connected to this leaf node. Likewise, Bit 4 indicates the AppleTalk packets, Bit 5 indicates the DECnet packets, Bit 6 indicates the OSI packets, Bit 7 indicates the VINES packets, and Bit 8 indicates the XNS packets."
::= { a3ComSfCtl 2 }

```
a3SfFlushCtl      OBJECT-TYPE
    SYNTAX        INTEGER {
         other         (1),
         all           (2)
    }
    ACCESS        read-write
    STATUS        mandatory
    DESCRIPTION
         "This object is used to flush all entries from
         the packet table regardless of protocol or
         packet type."
    ::= { a3ComSfCtl 3 }
```

This group of objects is used to indicate information about Smart Filtering operations on the agent.

```
a3SfState         OBJECT-TYPE
    SYNTAX        INTEGER {
         init          (1),
         idle          (2),
         active        (3),
         disabled      (4)
```

```
                }
        ACCESS          read-only
        STATUS          mandatory
        DESCRIPTION
                "This object is used to indicate the current
                Smart Filter operation state.  The active (3)
                state indicates there are Smart Filter
                operations running at the agent, packets have
                been transmitted to the LAN port periodically.
                The idle (2) state indicates the agent is
                waiting for configuration of the packet
                tables.  The init (1) state indicates the
                agent is being initialized.  The disabled (4)
                state indicates the agent has been disabled."
        :: = { a3ComSfCtl 4 } a3SfTotalPackets   OBJECT-TYPE
        SYNTAX          INTEGER
        ACCESS          read-only
        STATUS          mandatory
        DESCRIPTION
                "This object is used to indicate the total
                number of Smart Filter packets that have been
                established on the leaf node."
        :: = { a3ComSfCtl 5 } a3SfTotalCount     OBJECT-TYPE
        SYNTAX          INTEGER
        ACCESS          read-only
        STATUS          mandatory
        DESCRIPTION
                "This object is used to indicate the total
                number of Smart Filter packets that have been
                transmitted to the leaf node LAN port.  This
                number will be reset to zero when a3SfResetCtl
                object is set to apply (2)."
        :: = { a3ComSfCtl 6 }
```

```
a3SfInterface   OBJECT-TYPE
    SYNTAX      INTEGER
    ACCESS      read-only
    STATUS      mandatory
    DESCRIPTION
        "This object is used to indicate the interface
        number on the central router that's connected
        with the leaf node."
    ::= { a3ComSfCtl 7 }
```

This group of objects is used to describe the a3SfPkTypeTable and its entries. Each entry contains the control parameters and related information for packets of a particular type.

```
a3SfPkTypeTable   OBJECT-TYPE
    SYNTAX      SEQUENCE OF A3SfPkTypeEntry
    ACCESS      non-accessible
    STATUS      mandatory
    DESCRIPTION
        "A list of Smart Filtering packet type
        entries.  This table identifies which packet
        type the boundary routing leaf node transmit
        over its LAN port."
    ::= { A3ComSfPacket 1 } a3SfPkTypeEntry   OBJECT-TYPE
    SYNTAX      SEQUENCE OF A3SfPkTypeEntry
    ACCESS      non-accessible
    STATUS      mandatory
    DESCRIPTION
        "Each entry in this table identifies a
        specific packet type and its associated
        information.  The agent will apply control
        parameters specified for a specific packet
```

```
                  type when transmitting packets in the
                  a3SfPacketTable to its LAN port."
         INDEX   { a3SfPkTypeIndex }
         :: = { a3SfPkTypeTable 1 } a3SfPkTypeEntry  ::=      SEQUENCE {
         a3SfPkTypeIndex    INTEGER,
         a3SfPkTypeInterval INTEGER,
         a3SfPkTypeFlush    INTEGER,
         a3SfPkTypePackets  INTEGER,
         a3SfPkTypeCount    INTEGER,
         a3SfPkTypeState    INTEGER,
         a3SfPkTypeStatus   RowStatus
    } a3SfPkTypeIndex   OBJECT-TYPE
         SYNTAX       INTEGER {
                  ipxRIP (1),
                  ipxSAP(2),
                  ipRIP   (3),
    }
         ACCESS       read-only
         STATUS       mandatory
         DESCRIPTION
                  "This object uniquely identifies an entry in
                  the PacketType table.  Each such entry defines
                  one packet type and its associated parameters
                  used to transmit packets of the same type to
                  the leaf network.  The agent should
                  accommodate packet types that are yet to be
                  defines."
         :: = { a3SfPkTypeEntry 1 } a3SfTypeInterval  OBJECT-TYPE
```

```
        SYNTAX      INTEGER
        ACCESS      read-only
        STATUS      mandatory
        DESCRIPTION
            "This object specifies the number of seconds
            for the advertising interval of the
            a3SfPkTypeIndex packet type."
        :: = { a3SfPkTypeEntry 2 } a3SfTypeFlush   OBJECT-TYPE
        SYNTAX      INTEGER
        ACCESS      read-only
        STATUS      mandatory
        DESCRIPTION
            "This object indicates all packets of the
            a3SfPkTypeIndes type should be flushed."
        :: = { a3SfPkTypeEntry 3 } a3SfTypePackets OBJECT-TYPE
        SYNTAX      INTEGER
        ACCESS      read-only
        STATUS      mandatory
        DESCRIPTION
            "This object is used to indicate the number of
            a3SfPkTypeIndex type packets that have been
            established on the boundary routing leaf
            node."
        :: = { a3SfPkTypeEntry 4 } a3SfTypeCount   OBJECT-TYPE
        SYNTAX      INTEGER
        ACCESS      read-only
        STATUS      mandatory
        DESCRIPTION
```

"This object is used to indicate the number of
a3SfPkTypeIndex type packets that have been
transmitted over the LAN port on the boundary
routing leaf node."
::= { a3SfPkTypeEntry 5 }

```
a3SfPkTypeState   OBJECT-TYPE
    SYNTAX        INTEGER {
        active              (1),
        idle                (2)
    }
    ACCESS        read-only
    STATUS        mandatory
    DESCRIPTION
```
"This object is used to indicate the current
Smart Filter operation state or failure reason
code for the a3SfPkTypeIndex type packets.
The active (1) state indicates the agent has
been transmitting a3SfPkTypeIndex type packets
to its LAN port. The idle (2) state indicates
there is no packet of this type established in
the table."
::= { a3SfPkTypeEntry 6 }

```
a3SfPkTypeStatus  OBJECT-TYPE
    SYNTAX        RowStatus
    ACCESS        read-write
    STATUS        mandatory
    DESCRIPTION
```
"This object is used to add and remove entries
from this table."
::= { a3SfPkTypeEntry 7 }

This group of objects is used to describe the a3SfPacketTable and its entries.

```
a3SfPacketTable    OBJECT-TYPE
    SYNTAX        SEQUENCE OF A3SfPacketEntry
    ACCESS        not-accessible
    STATUS        mandatory
    DESCRIPTION
        "A list of Smart Filtering packet entries.
        This table identifies which packets the
        boundary routing leaf node transmit over its
        LAN port."
    ::= { a3ComSfPacket 2 } a3SfPacketEntry    OBJECT=TYPE
    SYNTAX        A3SfPacketEntry
    ACCESS        not-accessible
    STATUS        mandatory
    DESCRIPTION
        "Each entry in this table identifies a
        specific packet that the boundary routing leaf
        node will transmit over its LAN port."
    INDEX  { a3SfPkTypeIndex, a3SfPacketIndex }
    ::= {a3SfPacketTable 1 }

A3SfPacketEntry ::=        SEQUENCE {
    a3SfPacketTypeIndex    INTEGER,
    a3SfPacketIndex        INTEGER,
    a3SfPacketContent      OCTET STRING,
    a3SfpacketStatus       RowStatus
}
a3SfPacketTypeIndex OBJECT-TYPE
    SYNTAX        INTEGER
    ACCESS        read-only
    STATUS        mandatory
    DESCRIPTION
        "The PacketType entry that associates with
        this Packet entry.  The packet identified by a
``` particular value of this index is associated
with the same a3SfPkTypeEntry as identified by
the same value of a3SfPkTypeIndex."
::= { a3SfPacketEntry 1 }

```
a3SfPacketIndex    OBJECT-TYPE
    SYNTAX     INTEGER
    ACCESS     read-only
    STATUS     mandatory
    DESCRIPTION
```
"This object uniquely identifies an entry in
the Packet table amongst those generated by
the same PacketType entries.  These indexes
are assigned beginning with 1 and increase by
one with each new packet entry.  Each such
entry defines one packet that is to be
transmitted over the leaf network."
::= { a3SfPacketEntry 2 }

```
a3SfPacketContent  OBJECT-TYPE
    SYNTAX     INTEGER
    ACCESS     read-only
    STATUS     mandatory
    DESCRIPTION
```
"This object specifies a packet the boundary
routing leaf node will transmit out its LAN
port.  This object should contain the entire
packet to be transmitted, including the MAC
header."
::= { a3SfPacketEntry 3 }

```
a3SfPacketStatus   OBJECT-TYPE
    SYNTAX     Row-Status
    ACCESS     read-write
    STATUS     mandatory
```

```
              DESCRIPTION
                  "This object is used to add and remove entries
                  from this table."
              :: = { a3SfPacketEntry 4 }
```

This group of objects is used to identify server stations on the leaf network. The filter would be set up on the leaf node to filter broadcast packets from those server stations.

```
          a3SfAddrTable    OBJECT-TYPE
              SYNTAX       SEQUENCE OF A3SfAddEntry
              ACCESS       not-accessible
              STATUS       mandatory
              DESCRIPTION
                  "A list of server station entries on the leaf
                  network."
              :: = {a3ComSfPacket 3 } a3SfAddrEntry    OBJECT-TYPE
              SYNTAX       A3SfAddEntry
              ACCESS       not-accessible
              STATUS       mandatory
              DESCRIPTION
                  "Each entry in this table identifies the MAC
                  address of a server station on the leaf
                  network.  The leaf node will set up filters to
                  discard specific broadcast traffic from the
                  server specified."
              INDEX  {a3SfAddrPkTypeIndex, a3SfAddrMACaddr }
              :: = { a3SfAddrTable 1 }

A3SfAddrEntry  :: =              SEQUENCE {
              a3SfAddrPkTypeIndex INTEGER,
              a3SfAddrMACaddr     OCTET STRING(6),
              a3SfAddrStatus      RowStatus
```

}

```
a3SfAddrPkTypeIndex OBJECT-TYPE
        SYNTAX      INTEGER
        ACCESS      read-only
        STATUS      mandatory
        DESCRIPTION
            "This object uniquely identifies an entry in
            the PkType table amongst those generated by
            the same PacketType entries.  These indexes
            are assigned beginning with 1 and increase by
            one with each new packet entry.  Each such
            entry defines one packet that is to be
            transmitted over the leaf network."
        ::= { a3SfAddrEntry 1 } a3SfAddrMACaddr     OBJECT-TYPE
        SYNTAX      OCTET STRING
        ACCESS      not-accessible
        STATUS      mandatory
        DESCRIPTION
            "This object specifies a packet the boundary
            routing leaf node will transmit out its LAN
            port.  This object should contain the entire
            packet to be transmitted, including the MAC
            header."
        ::= { a3SfAddrEntry 2 } a3SfAddrStatus      OBJECT-TYPE
        SYNTAX      RowStatus
        ACCESS      read-write
        STATUS      mandatory
        DESCRIPTION
```

```
                "This object is used to add and remove entries
                from the a3SfAddrTable."
        :: = { a3SfAddrEntry 3 }
```

This object group allows a leaf node to notify its central router about important information it has acquired. Unlike the rest of Smart Filter MIB, this object group is implemented at the central router.

```
        a3SfLeafInfoTable OBJECT-TYPE
                SYNTAX      SEQUENCE OF A3SfLeafInfoEntry
                ACCESS      not-accessible
                STATUS      mandatory
                DESCRIPTION
                        "A pseudo table used to notify central router
                        which station address learned from the leaf
                        network needs to be removed."
                :: = { a3ComSfLeafInfo 1 } a3SfLeafInfoEntry OBJECT-TYPE
                SYNTAX      A3SfLeafInfoEntry
                ACCESS      not-accessible
                STATUS      mandatory
                DESCRIPTION
                        "A pseudo entry in the a3SfLeafInfoTable."
                INDEX  { A3SfLeafInfoIndex }
                :: = { a3SfLeafInfoTable 1 }

A3SfLeafInfoEntry :: = SEQUENCE {
                a3SfLeafInfoIndex INTEGER,
                a3SfLeafMACaddr   OCTET STRING (6),
                a3SfLeafError     INTEGER
        }
        a3SfLeafInfoIndex OBJECT-TYPE
                SYNTAX      INTEGER
```

```
            ACCESS      read-only
            STATUS      mandatory
            DESCRIPTION
                "A dummy index object for the pseudo table
                entry."
        ::= { a3SfLeafInfoEntry 1 } a3SfLeafMACaddr    OBJECT-TYPE
        SYNTAX      OCTET STRING (6)
        ACCESS      read-only
        STATUS      mandatory
        DESCRIPTION
                "This object identify a MAC address of a
                station that central router has learned from
                the leaf network.  The corresponding entry in
                the routing information entry, e.g. a SAP
                entry in IPX routing table, should be
                removed."
        ::= { a3SfLeafInfoEntry 2 } a3SfLeafError      OBJECT-TYPE
        SYNTAX      INTEGER {
            NoResource   (1),
            Unknown      (2)
        }
        ACCESS      read-write
        STATUS      mandatory
        DESCRIPTION
                "This object reports to the central router
                about the abnormal situation the leaf node has
                run into."
        ::= { a3SfLeafInfoEntry 3 }

END
```

We claim:

1. An apparatus for controlling network traffic from a central device across a communication link to a remote network connected to the communication link by a remote interface, comprising:

central traffic management resources in the central device, coupled to the communication link which monitor contents of data packets received across the communication link to learn characteristics of the remote network, produce traffic management messages in response to the learned characteristics, and forward the traffic management messages to the remote interface where traffic on the communication link is controlled in response to the traffic management messages.

2. The apparatus of claim 1, wherein the traffic management messages identify types of packets to be forwarded from the remote interface across the communication link.

3. The apparatus of claim 1, wherein the traffic management messages identify types of packets to be composed by the remote interface for communication to users of the remote network.

4. The apparatus of claim 1, wherein the central traffic management resources execute a transport protocol for the traffic management messages independent of a network address for the remote interface.

5. A system for controlling traffic across a communication link between a remote network and a central device, comprising:

a remote network interface, connected to the remote network, including data forwarding resources which, according to forwarding rules, forward data packets originated by users of the remote network across the communication link to the central device in response to characteristics of the data packets;

central link management resources in the central device which monitor contents of the forwarded data packets received across the communication link from the remote network interface to learn characteristics of network protocols executed by users of the remote network, and in response to the learned characteristics, generate link management messages, and forward the link management messages to the remote interface; and remote link management resources in the remote interface responsive to the link management messages received from the central link management resources to tailor the forwarding rules to the learned characteristics of the users of the remote network to reduce unnecessary traffic on the communication link.

6. The system of claim 5, wherein the central link management resources also generate remote network management messages based on a protocol executed by other users of the central device, and forward the remote network management messages to the remote interface; and further including remote network management resources in the remote interface which produce network management packets in response to the remote network management messages, and communicate the network management packets to the users of the remote network as needed according to the protocol.

7. The system of claim 6, wherein the central link management resources monitor characteristics of data packets received from other users of the central device to learn about changes which need to be made to the network management packets produced in the remote network management resources, generate network management messages indicating the changes, and forward the network management messages to the remote interface; and further including resources in the remote network interface which change the network management packets in response to the network management messages indicating the changes.

8. The system of claim 5, wherein the remote interface has a network address, and further including a transport mechanism which provides for communication of the link management messages to the remote interface, wherein the transport mechanism is independent of the network address of the remote interface.

9. The system of claim 6, wherein the remote interface has a network address, and further including a transport mechanism which provides for communication of the link management messages and the remote network management messages to the remote interface, wherein the transport mechanism is independent of the network address of the remote interface.

10. The system of claim 5, wherein the forwarding rules include a filter based upon source addresses in the data packets.

11. The system of claim 5, wherein the central device includes resources which forward data packets having destination addresses equal to addresses of users of the remote network across the communication link to the remote interface, which forwards the packets to the users of the network.

12. A system for controlling traffic across a communication link between a remote network and a central device, comprising:

a remote network interface, connected to the remote network, including data forwarding resources which, according to forwarding rules, forward data packets originated by users of the remote network across the communication link to the central device in response to characteristics of the data packets:

central link management resources in the central device which monitor characteristics of the forwarded data packets received across the communication link from the remote network interface to learn characteristics of users of the remote network, and in response to the learned characteristics, generate link management messages, and forward the link management messages to the remote interface; and remote link management resources in the remote interface responsive to the link management messages received from the central link management resources to tailor the forwarding rules to the learned characteristics of the users of the remote network to reduce unnecessary traffic on the communication link;

wherein the forwarding rules include a table of source addresses, and the forwarding resources do not forward broadcast data packets having source addresses in the table to the central device.

13. The system of claim 12, wherein the remote link management resources update the table of source addresses in response to the link management messages received from the central link management resources.

14. The system of claim 13, wherein the central device includes multiprotocol router resources, and users of the remote network access the multiprotocol router resources through the remote interface.

15. A system for controlling traffic across a communication link between a remote network and a central device, comprising:

a remote network interface, connected to the remote network, including data forwarding resources which, according to forwarding rules, forward data packets originated by users of the remote network across the communication link to the central device in response to characteristics of the data packets;

central link management resources in the central device which monitor characteristics of the forwarded data packets received across the communication link from the remote network interface to learn characteristics of users of the remote network, and in response to the learned characteristics generate link management messages, and forward the link management messages to the remote interface; and remote link management resources in the remote interface responsive to the link management messages received from the central link management resources to tailor the forwarding rules to the learned characteristics of the users of the remote network to reduce unnecessary traffic on the communication link;

wherein the central device includes multiprotocol router resources, the remote interface has a network address, and users of the remote network access the multiprotocol router resources by sending packets through the remote interface where the forwarding resources forward such packets to the central device.

16. A system for controlling traffic across a communication link between a remote network and a central device, comprising:

a remote network interface, connected to the remote network, including data forwarding resources which, according to forwarding rules, forward data packets originated by users of the remote network across the communication link to the central device in response to characteristics of the data packets:

central link management resources in the central device which monitor characteristics of the forwarded data packets received across the communication link from the remote network interface to learn characteristics of users of the remote network, and in response to the learned characteristics, generate link management messages, and forward the link management messages to the remote interface, and also generate remote network management messages based on a protocol executed by other users of the central device, and forward the remote network management messages to the remote interface;

remote link management resources in the remote interface responsive to the link management messages received from the central link management resources to tailor the forwarding rules to the learned characteristics of the users of the remote network to reduce unnecessary traffic on the communication link; and remote network management resources in the remote interface which produce network management packets in response to the remote network management messages, and communicate the network management packets to the users of the remote network as needed according to the protocol;

wherein the remote network management resources include a table of network management packets to be communicated to users of the remote network according to the protocol, and resources to update the table in response to the network management messages.

17. The system of claim 16, wherein the central link management resources monitor characteristics of data packets received from other users of the central device to learn about changes which need to be made to the network management packets produced in the remote network management resources, generate network management messages indicating the changes, and forward the network management messages to the remote interface; and further including resources in the remote network interface which change the remote network management packets in response to the network management messages indicating the changes.

18. A system for controlling traffic across a communication link between a remote network and a central device, comprising:

a remote network interface, connected to the remote network, including data forwarding resources which according to forwarding rules, forward data packets originated by users of the remote network across the communication link to the central device in response to characteristics of the data packets;

central link management resources in the central device which generate remote network management messages based on a protocol executed by other users of the central device, and forward the remote network management messages to the remote interface;

remote network management resources in the remote interface which produce network management packets in response to the remote network management messages, and communicate the network management packets to the users of the remote network as needed according to the protocol; and wherein the central device includes multiprotocol router resources, the remote interface has a network address, and users of the remote network access the multiprotocol router resources by sending packets through the remote interface where the forwarding resources forward such packets to the central device.

19. The system of claim 18, wherein the central link management resources monitor characteristics of data packets received from other users of the central device to learn about changes which need to be made to the network management packets produced in the remote network management resources, generate network management messages indicating the changes, and forward the network management messages to the remote interface; and further including resources in the remote network interface which change the network management packets in response to the network management messages indicating the changes.

20. The system of claim 18, further including a transport mechanism which provides for communication of the remote network management messages to the remote interface, wherein the transport mechanism is independent of the network address of the remote interface.

21. An apparatus that connects a first network and a second network, comprising:

a communication link;

a first processor, having a first interface coupled to the first network through which frames of data are transmitted and received to and from the first network and a second interface coupled to the communication link through which frames of data are transmitted and received to and from the communication link, the first processor providing network services to frames of data received through the first and second interfaces from users of the first and second networks and transmitting frames of data through the first interface to users of the first network and through the second interface across the communication link to users of the second network; and a second processor, coupled to the second network and to the communication link, the second processor forwarding frames of data from users of the second network, which request the network services, or broadcast frames, across the communication link to the second interface of the first processor, and forwarding frames of data received across the communication link from the first processor to the second network;

a link manager in the first processor which monitor packets received across the communication link to learn characteristics of users of the second network, produce traffic management messages in response to the learned characteristics, and forward the traffic management messages to the second processor; and a link manager agent in the second processor which filters broadcast frames in response to the traffic management messages.

22. The apparatus of claim 21, including:

resources in the first processor which generate traffic management messages based on a protocol executed by users of the first network;

resources in the second processor which produce network management packets in response to the traffic management messages, and communicate the network management packets to the users of the second network as needed according to the protocol.

23. The apparatus of claim 22, wherein the resources in the first processor monitor characteristics of data packets received from users of the first network to learn about changes which need to be made to the network management packets produced by the resources in the second processor, generate traffic management messages indicating the changes, and forward the traffic management messages to the second processor; and further including resources in the second processor which change the network management packets in response to the traffic management messages indicating the changes.

24. The apparatus of claim 21, further including a transport mechanism which provides for communication of the traffic management messages to the second processor, wherein the transport mechanism is independent of the network address of the second processor.

25. The apparatus of claim 21, wherein the first processor includes multiprotocol router resources, and users of the second network access the multiprotocol router resources by sending packets through the second processor which forwards such packets to the first processor.

26. A method for managing traffic between a first node and second node connected by a communication link; comprising:

monitoring with processing resources in the first node contents of packets in traffic transmitted to and received from the network through the second node across the communication link;

developing with processing resources in the first node, a traffic management policy in the first node in response to the contents of the packets; and delegating to the second node across the communication link, resources to execute the traffic management policy.

27. The method of claim 26, wherein the step of monitoring includes determining whether a packet received across the communication link in the first node is a broadcast packet, and what source originated the packet, and the step of delegating includes sending a source address of a source which originates broadcast packets not needed at the first node, so that the second node can filter broadcast packets having said source address.

28. The method of claim 26, wherein the step of monitoring includes determining whether a packet transmitted to the second node across the communication link is a periodic packet and whether the second node has received the periodic packet before, and step of delegating includes sending an indication of contents of the periodic packet if it has been sent to the second node before, so that the second node can spoof said periodic packet.

29. The method of claim 26, wherein the step of delegating includes providing a transport mechanism by which the first node and the second node communicate across the communication link, wherein the transport mechanism is independent of any configured network address.

30. The method of claim 26, including providing multiprotocol routing resources in the first node.

31. A method for managing traffic between a first node and second node connected by a communication link; comprising:

providing multiprotocol routing resources in the first node;

monitoring with processing resources in the first node characteristics of traffic transmitted to and received from the second node across the communication link, the characteristics including (1) whether a packet received across the communication link in the first node is a broadcast packet, and what source originated the packet, and (2) whether a packet transmitted to the second node across the communication link is a periodic packet and whether the second node has received the periodic packet before;

developing with processing resources in the first node, traffic management messages in response to the characteristics, wherein the traffic management messages include a source address of a source which originates broadcast packets not needed at the first node, so that the second node can filter broadcast packets from having the delegated source address, and the traffic management messages include an indication of contents of a periodic packet if it has not been sent to the second node before, so that the second node can spoof the periodic packet;

providing a transport mechanism by which the first node and the second node communicate traffic management messages across the communication link independent of any configured network address; and sending the traffic management messages to the second node across the communication link using the transport mechanism, so that processing resources in the second node can control the traffic in response to the traffic management messages.

* * * * *